United States Patent
Teller et al.

(10) Patent No.: US 8,756,870 B2
(45) Date of Patent: Jun. 24, 2014

(54) ROOF CLAMP

(75) Inventors: William Teller, Lake Orion, MI (US);
Dorian J. Kilgore, Southfield, MI (US);
Walter B. Pipp, Birmingham, MI (US);
Elio G. Evangelista, Chesterfield, MI (US)

(73) Assignee: A. Raymond et cie, Grenoble (FR)

( * ) Notice: Subject to any disclaimer, the term of this patent is extended or adjusted under 35 U.S.C. 154(b) by 100 days.

(21) Appl. No.: 13/220,493

(22) Filed: Aug. 29, 2011

(65) Prior Publication Data
US 2012/0304556 A1    Dec. 6, 2012

Related U.S. Application Data

(60) Provisional application No. 61/493,296, filed on Jun. 3, 2011.

(51) Int. Cl.
*E04D 13/00* (2006.01)
*E04B 1/00* (2006.01)
*E04D 1/34* (2006.01)
*E04B 1/38* (2006.01)
*E04D 13/18* (2014.01)

(52) U.S. Cl.
USPC .......... 52/24; 52/271; 52/545; 52/547; 52/25; 52/26; 52/173.3; 52/698

(58) Field of Classification Search
CPC ....... F24J 2/5249; F24J 2/5258; F24J 2/5203; F24J 2002/5284; Y02E 10/47; Y02B 10/20; E04D 13/10
USPC ..................... 52/24–26, 173.3, 698
See application file for complete search history.

(56) References Cited

U.S. PATENT DOCUMENTS

| | | | |
|---|---|---|---|
| 529,774 A | 11/1894 | Baird | |
| 1,666,754 A | 4/1928 | Rahe | |
| 2,593,064 A | 4/1952 | Silberman | |
| 2,727,552 A * | 12/1955 | Chvesta | 411/112 |

(Continued)

FOREIGN PATENT DOCUMENTS

| | | |
|---|---|---|
| JP | 11-093345 | 4/1999 |
| JP | 11-159071 | 6/1999 |

(Continued)

OTHER PUBLICATIONS

Drawings of S-5 Wind Clamp (2pp) (offered for sale in U.S. or published prior to Aug. 29, 2011).

(Continued)

*Primary Examiner* — Brian Glessner
*Assistant Examiner* — Omar Hijaz
(74) *Attorney, Agent, or Firm* — Harness, Dickey & Pierce, P.L.C.

(57) ABSTRACT

Roof clamps and methods of securing roof clamps are provided. The roof clamps include a saddle, a wedge, and a securing member. The securing member facilitates engaging a seam of a roof with the clamp and removably fixing the roof clamp to the seam through the camming action of the wedge against a region of the saddle. The securing member also serves as the connection point for an auxiliary item, such as a solar panel or a snow guard. The placement of the securing member allows the roof clamp to be secured from, and the auxiliary item to be attached at, a top surface of the saddle.

38 Claims, 17 Drawing Sheets

(56) References Cited

U.S. PATENT DOCUMENTS

| | | | |
|---|---|---|---|
| 3,027,014 A * | 3/1962 | Lindblom | 211/85.23 |
| 4,049,253 A * | 9/1977 | Mandel | 269/137 |
| 4,189,881 A | 2/1980 | Hawley | |
| 4,478,210 A | 10/1984 | Sieradski | |
| 5,106,586 A * | 4/1992 | Muszak et al. | 422/560 |
| 5,228,248 A | 7/1993 | Haddock | |
| 5,371,979 A | 12/1994 | Kwiatkowski et al. | |
| 5,480,494 A | 1/1996 | Inoue | |
| 5,491,931 A | 2/1996 | Haddock | |
| 5,522,185 A | 6/1996 | Cline | |
| 5,570,549 A | 11/1996 | Lung et al. | |
| 5,571,338 A | 11/1996 | Kadonome et al. | |
| 5,596,858 A | 1/1997 | Jordan | |
| 5,694,721 A | 12/1997 | Haddock | |
| 5,715,640 A | 2/1998 | Haddock | |
| 5,732,513 A | 3/1998 | Alley | |
| 5,740,996 A | 4/1998 | Genshorek | |
| 5,797,573 A * | 8/1998 | Nasu | 248/231.31 |
| 5,799,697 A * | 9/1998 | Sakaguchi et al. | 137/625.65 |
| 5,983,588 A | 11/1999 | Haddock | |
| 6,105,317 A | 8/2000 | Tomiuchi et al. | |
| 6,164,033 A | 12/2000 | Haddock | |
| 6,223,477 B1 | 5/2001 | Alley | |
| 6,443,679 B1 * | 9/2002 | Schwarz | 411/352 |
| 6,446,313 B2 | 9/2002 | Pfister | |
| 6,495,750 B1 | 12/2002 | Dinwoodie | |
| 6,499,259 B1 | 12/2002 | Hockman | |
| 6,501,013 B1 | 12/2002 | Dinwoodie | |
| 6,534,703 B2 | 3/2003 | Dinwoodie | |
| 6,570,084 B2 | 5/2003 | Dinwoodie | |
| 6,672,018 B2 | 1/2004 | Shingleton | |
| 6,685,378 B2 * | 2/2004 | Huang et al. | 403/150 |
| 6,688,047 B1 | 2/2004 | McNichol | |
| 6,809,253 B2 | 10/2004 | Dinwoodie | |
| 6,843,394 B2 | 1/2005 | Aki | |
| 7,013,612 B2 * | 3/2006 | Haddock | 52/545 |
| 7,127,852 B1 | 10/2006 | Dressler | |
| 7,213,373 B2 | 5/2007 | Hockman | |
| 7,246,547 B2 * | 7/2007 | Van Walraven | 81/461 |
| 7,318,256 B2 * | 1/2008 | Lubera et al. | 24/295 |
| 7,386,922 B1 * | 6/2008 | Taylor et al. | 24/569 |
| 7,435,134 B2 | 10/2008 | Lenox | |
| 7,469,505 B2 | 12/2008 | Hockman | |
| 7,487,617 B2 | 2/2009 | Hockman | |
| 7,513,080 B1 * | 4/2009 | Showalter | 52/24 |
| 7,549,253 B2 | 6/2009 | Hockman | |
| 7,673,842 B2 | 3/2010 | Nevers et al. | |
| 7,703,256 B2 | 4/2010 | Haddock | |
| 7,758,011 B2 | 7/2010 | Haddock | |
| 7,774,989 B2 | 8/2010 | Fisher | |
| 7,866,099 B2 | 1/2011 | Komamine et al. | |
| 7,915,519 B2 | 3/2011 | Kobayashi | |
| 7,921,607 B2 | 4/2011 | Thompson et al. | |
| 7,984,596 B1 * | 7/2011 | Simpson et al. | 52/520 |
| 8,070,119 B2 | 12/2011 | Taylor | |
| 8,251,326 B2 * | 8/2012 | McPheeters | 248/228.2 |
| 8,272,172 B2 * | 9/2012 | Li | 52/24 |
| 8,376,298 B2 * | 2/2013 | McPheeters | 248/231.41 |
| 8,528,888 B2 * | 9/2013 | Header | 269/91 |
| 2002/0088196 A1 | 7/2002 | Haddock | |
| 2005/0257434 A1 | 11/2005 | Hockman | |
| 2007/0199561 A1 | 8/2007 | Soucy | |
| 2007/0284796 A1 * | 12/2007 | Hummel | 269/41 |
| 2008/0053009 A1 | 3/2008 | Plaisted et al. | |
| 2010/0012805 A1 | 1/2010 | Taylor | |
| 2010/0058701 A1 * | 3/2010 | Yao et al. | 52/547 |
| 2010/0281793 A1 | 11/2010 | McPheeters et al. | |
| 2010/0282920 A1 | 11/2010 | McPheeters | |
| 2010/0284737 A1 | 11/2010 | McPheeters | |
| 2011/0203637 A1 | 8/2011 | Patton et al. | |
| 2011/0214366 A1 | 9/2011 | Haddock et al. | |
| 2011/0214367 A1 | 9/2011 | Haddock et al. | |
| 2011/0214368 A1 * | 9/2011 | Haddock et al. | 52/173.3 |
| 2011/0232212 A1 * | 9/2011 | Pierson et al. | 52/173.3 |
| 2012/0299233 A1 * | 11/2012 | Header | 269/91 |

FOREIGN PATENT DOCUMENTS

| | | |
|---|---|---|
| JP | 11-303346 | 11/1999 |
| KR | 20110116416 A | 10/2011 |
| WO | WO 00/56018 | 9/2000 |

OTHER PUBLICATIONS

Photographs of S-5! Roof Clamp (6pp) (offered for sale in U.S. or published prior to Aug. 29, 2011).

Brochure of SnapNrack Commercial Products, "Specifications—Metal Roof Seam Clamp"; SnapNrack PV Mounting System, Nov. 30, 2010—Rev 3.1 (4pp).

Photographs of SNO-GEM Barricade photos (2pp)—(offered for sale in U.S. or published prior to Aug. 29, 2011).

Brochure of UNIRAC, "ACECLAMP® jr Technical Datasheets"; Pub 100602-1td V1.0 Jun. 2010 (3pp).

English translation of Korean Patent No. 10-2011-0116416.

\* cited by examiner

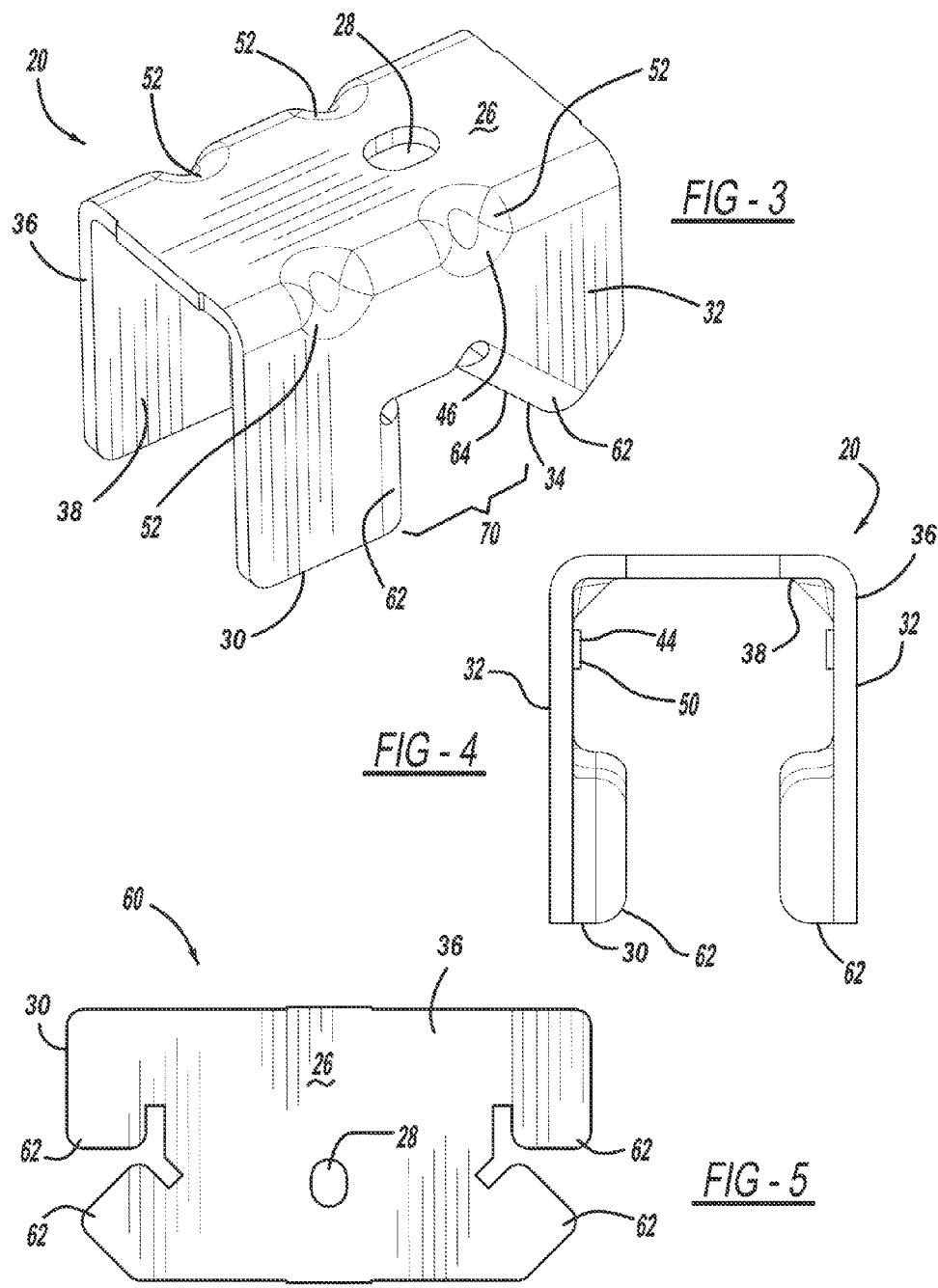

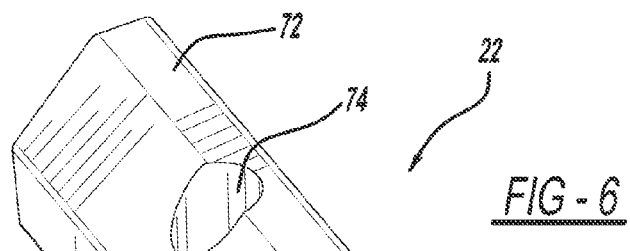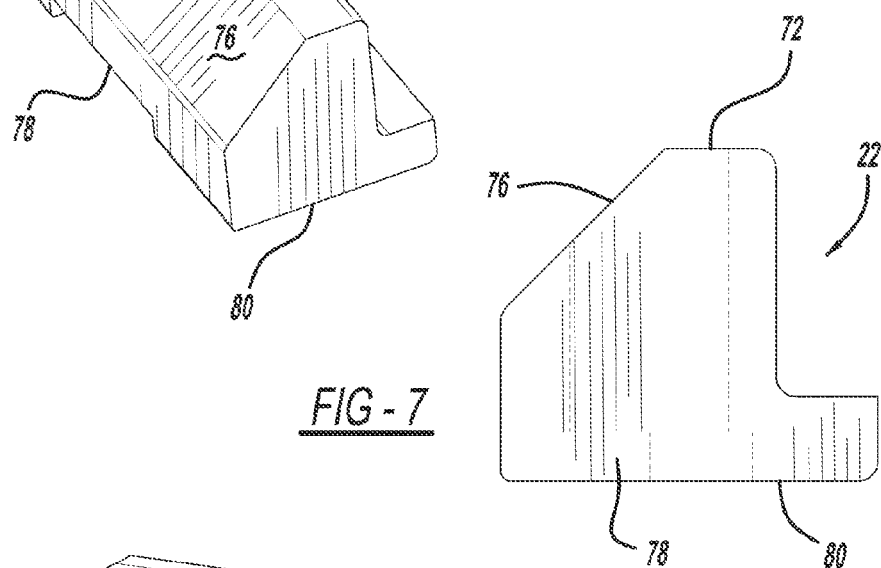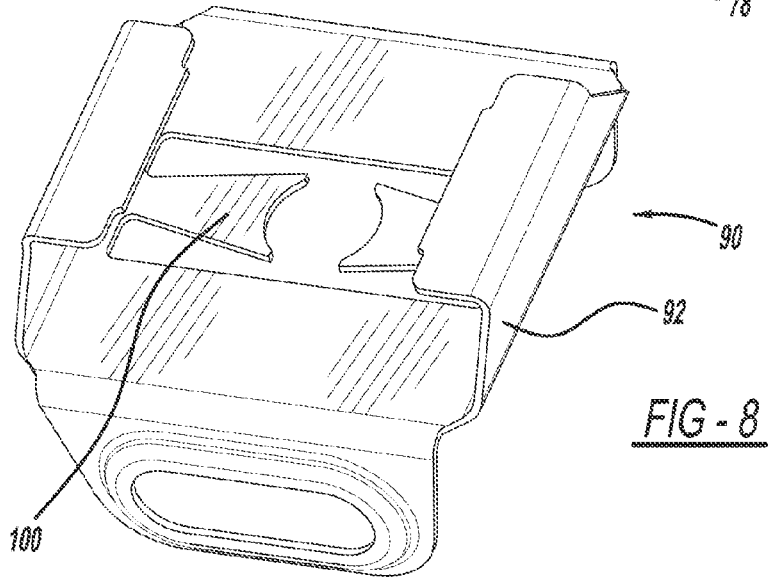

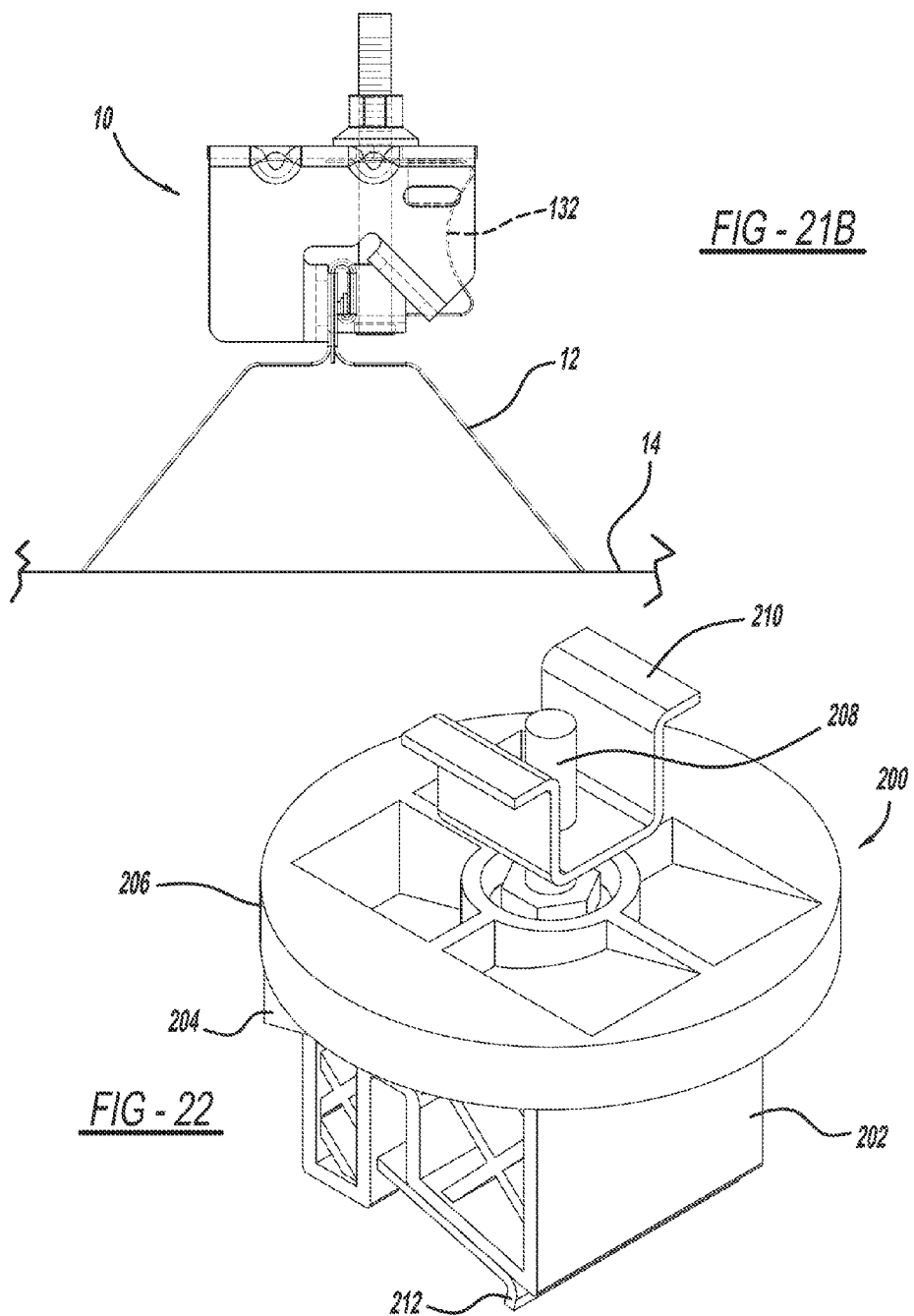

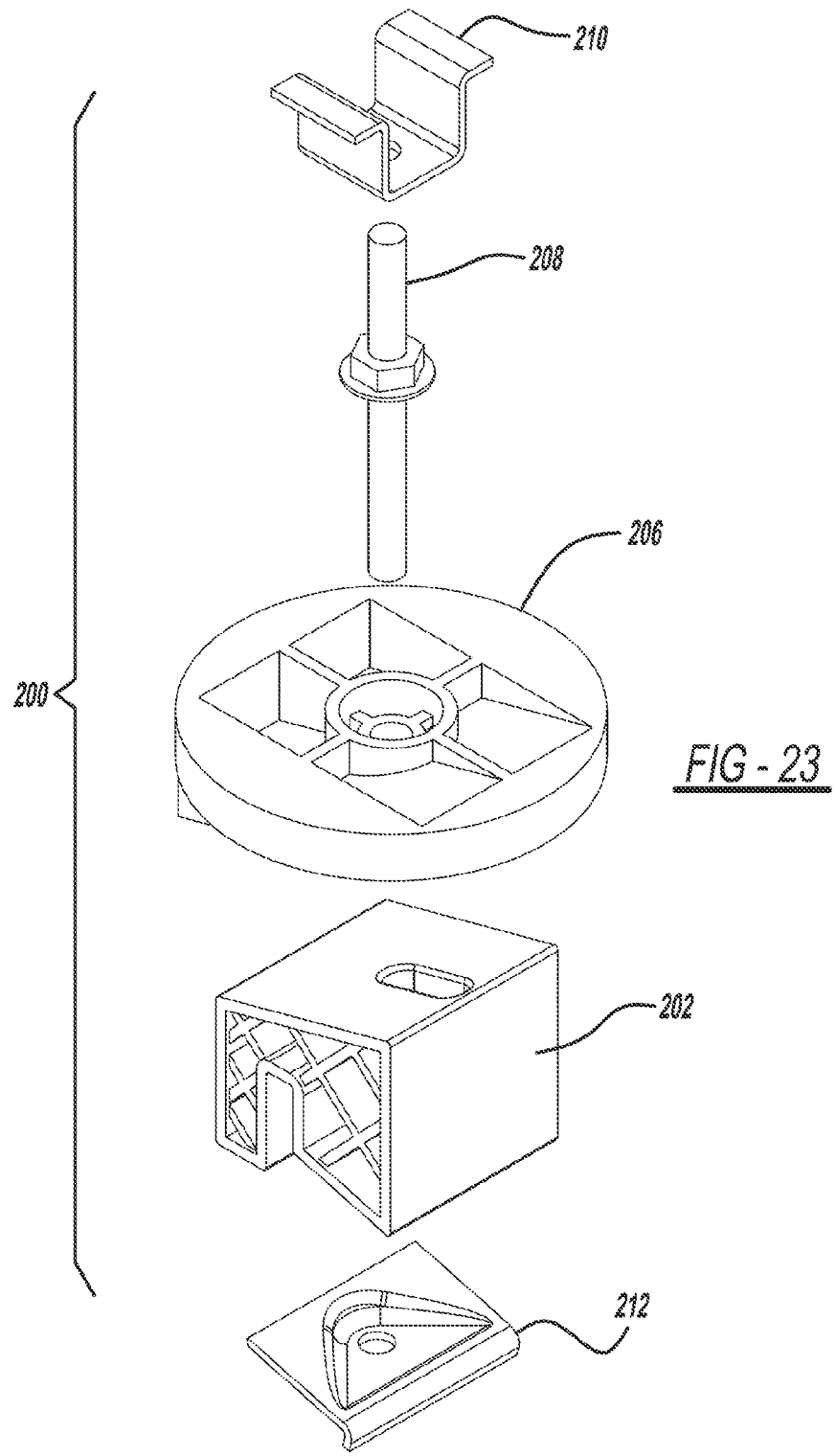

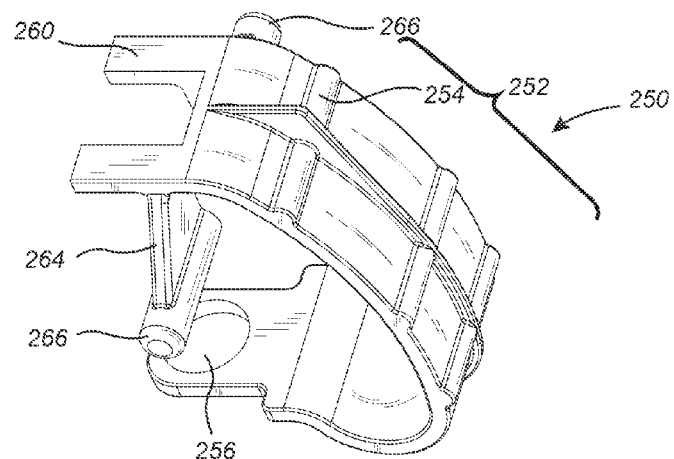
Fig - 26A
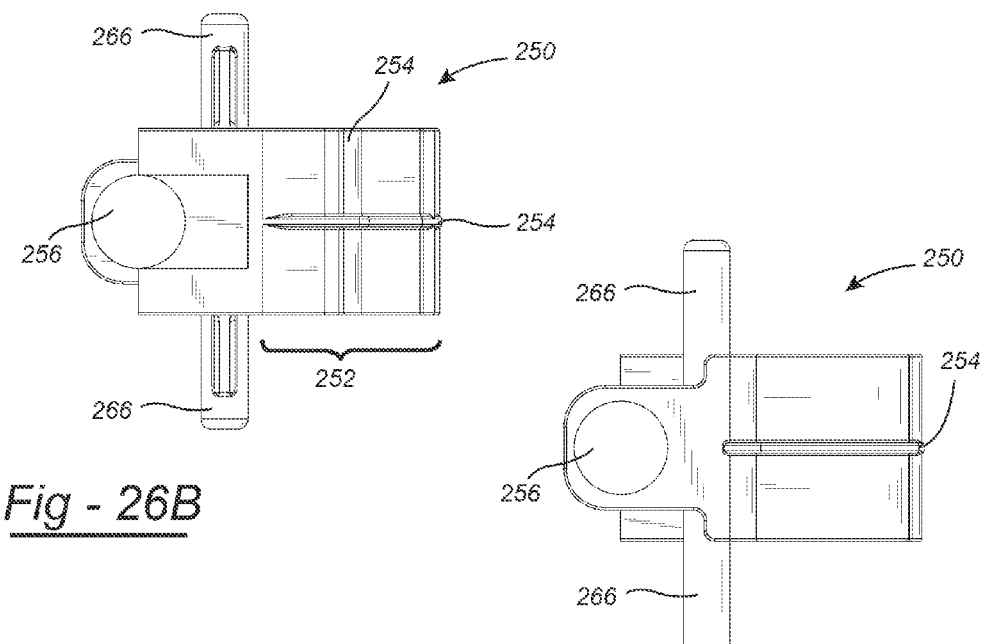
Fig - 26B
Fig - 26C

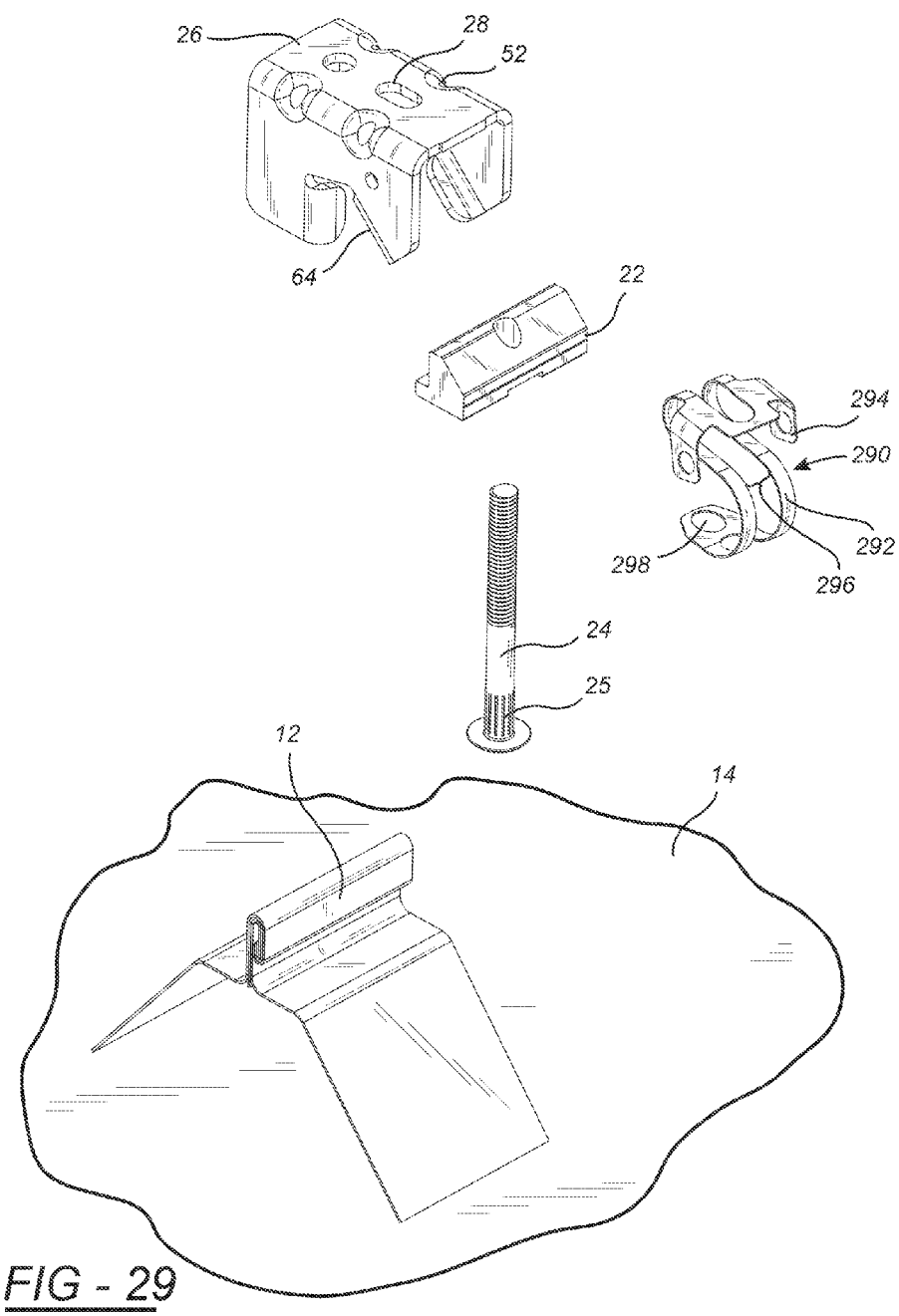

ROOF CLAMP

CROSS-RELATED APPLICATIONS

This application claims priority to U.S. Provisional Application Ser. No. 61/493,296 filed Jun. 3, 2011 which is incorporated herein by reference.

FIELD

The present disclosure relates generally to roof clamps and more specifically to roof clamps that attach an auxiliary component to a roof seam.

BACKGROUND

Securing auxiliary components, such as a rail, a snow guard, or a solar panel, to a roof often requires a roof clamp. Certain traditional roof clamps damage the roof by piercing a seam or other portion of the roof with the fastener used to connect the roof clamp and the seam. Piercing the seam alters the integrity of the roof and increases the risk of the roof leaking and damaging the building and contents sheltered by the roof. These problems are compounded when the auxiliary component is to be secured to a metal roof.

Other conventional roof clamps are cumbersome to use and require multiple attachment points to secure a single clamp to the roof or to secure an auxiliary component to the roof. For example, U.S. Pat. No. 7,386,922 discloses a snow guard clamping unit that includes a retainer screw to secure a top piece and a shaped base via a first opening. The snow guard clamping unit also includes a second threaded opening formed in the top to attach the snow guard. During installation, the installer disadvantageously juggles multiple parts since multiple attachment points are used to secure the single clamp and a snow guard, for example, to the roof. This prolongs installation time and increases costs.

Further, the angle at which the roof clamp is installed is often awkward because only the small space where the roof clamp is designed to abut the roof or the small space along a side surface of the roof clamp is accessible. In certain installations, these small spaces provide a clearance of less than one inch in which to place tools or fasteners and to perform the installation. This limited clearance causes the installers to contort their hands and tools to access the limited space, causes inefficient work, and ultimately lengthens installation time and increases costs. For example, U.S. Pat. No. 7,758,011 discloses an adjustable mounting assembly for standing seam panels and requires that one or more fasteners be used to secure the mounting assembly from a side surface of the assembly. These fasteners are placed in an area that has such limited clearance that the installation would be inefficient, cumbersome, and expensive.

SUMMARY

In accordance with the present disclosure a roof clamp is provided. In other aspects, the roof clamp includes a saddle comprising a top including a saddle bore, a bottom surface, two sidewalls spanning from the top to the bottom surface, and a camming surface located at the sidewalls. In further aspects, the roof clamp also includes a roof seam-engaging wedge including a wedge bore. Another aspect provides a securing member fitting into and aligning with a saddle bore with a wedge bore.

In still other aspects of the present teachings, a roof clamp is provided which includes a saddle, a clip within the saddle, a roof seam-engaging wedge, and a securing member to align the saddle bore, the clip bore, and the roof seam-engaging wedge. In various aspects, the saddle further includes a generally vertical access slot to receive a roof seam and also includes a camming surface.

In still other aspects, the present teachings provide a roof clamp for attaching a component to a roof seam of a building. Another aspect employs a roof clamp including a saddle, a roof seam-engaging wedge, a substantially vertically accessible slot to engage a roof seam, and a single shaft to move the roof seam-engaging wedge into engagement with the roof seam and to secure a component to the roof. In yet other aspects, a method of attaching a component to a roof seam of a building, methods of securing a roof clamp to a roof, and methods of fixing a roof clamp to a roof are provided.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 3 depicts a perspective view of a saddle of a first embodiment according to the present teachings;

FIG. 4 depicts a side elevational view of the saddle of the first embodiment of the roof clamp according to the present teachings;

FIG. 5 depicts a top elevational view of a flattened blank of the saddle of the first embodiment of the roof clamp according to the present teachings;

FIG. 6 depicts a perspective view of a roof seam-engaging wedge of the first embodiment of the roof clamp according to the present teachings;

FIG. 7 depicts a side of a roof seam-engaging wedge of the first embodiment of the roof clamp according to the present teachings;

FIG. 8 depicts a side view of a clip of the first embodiment of the roof clamp according to the present teachings;

FIGS. 21A-21B depict side views of an assembled roof clamp attached to a roof seam where the roof clamp is in a first and a second position, respectively;

FIG. 22 depicts a perspective view of a third and alternate embodiment of a roof clamp according to the present teachings;

FIG. 23 depicts an exploded view of the roof clamp according to the third and alternate embodiment of the present teachings;

FIG. 26A depicts a side perspective view of the spring clip according to the fourth embodiment of the present teachings;

FIG. 26B depicts a top view of the spring clip according to the fourth embodiment of the present teachings;

FIG. 26C depicts a bottom view of the spring clip according to the fourth embodiment of the present teachings;

FIG. 29 depicts an exploded view of a roof seam having a fifth embodiment of a roof clamp attached according to the present teachings.

DETAILED DESCRIPTION

Figure 1:
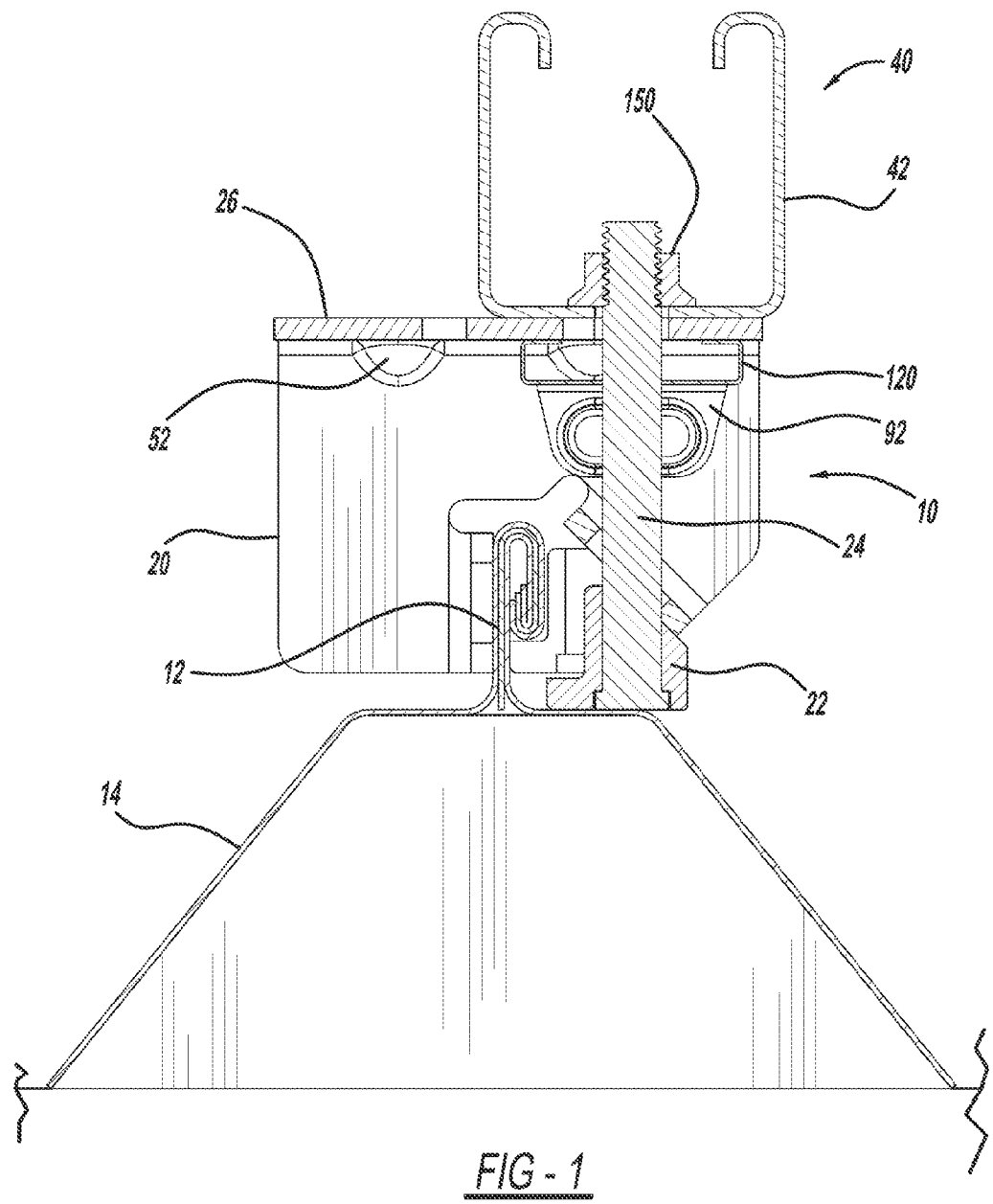
FIG. 1 depicts a cross-sectional view of a roof seam having a first embodiment of a roof clamp attached thereto as depicted in FIG. 15 according to the present teachings.
Figure 2:
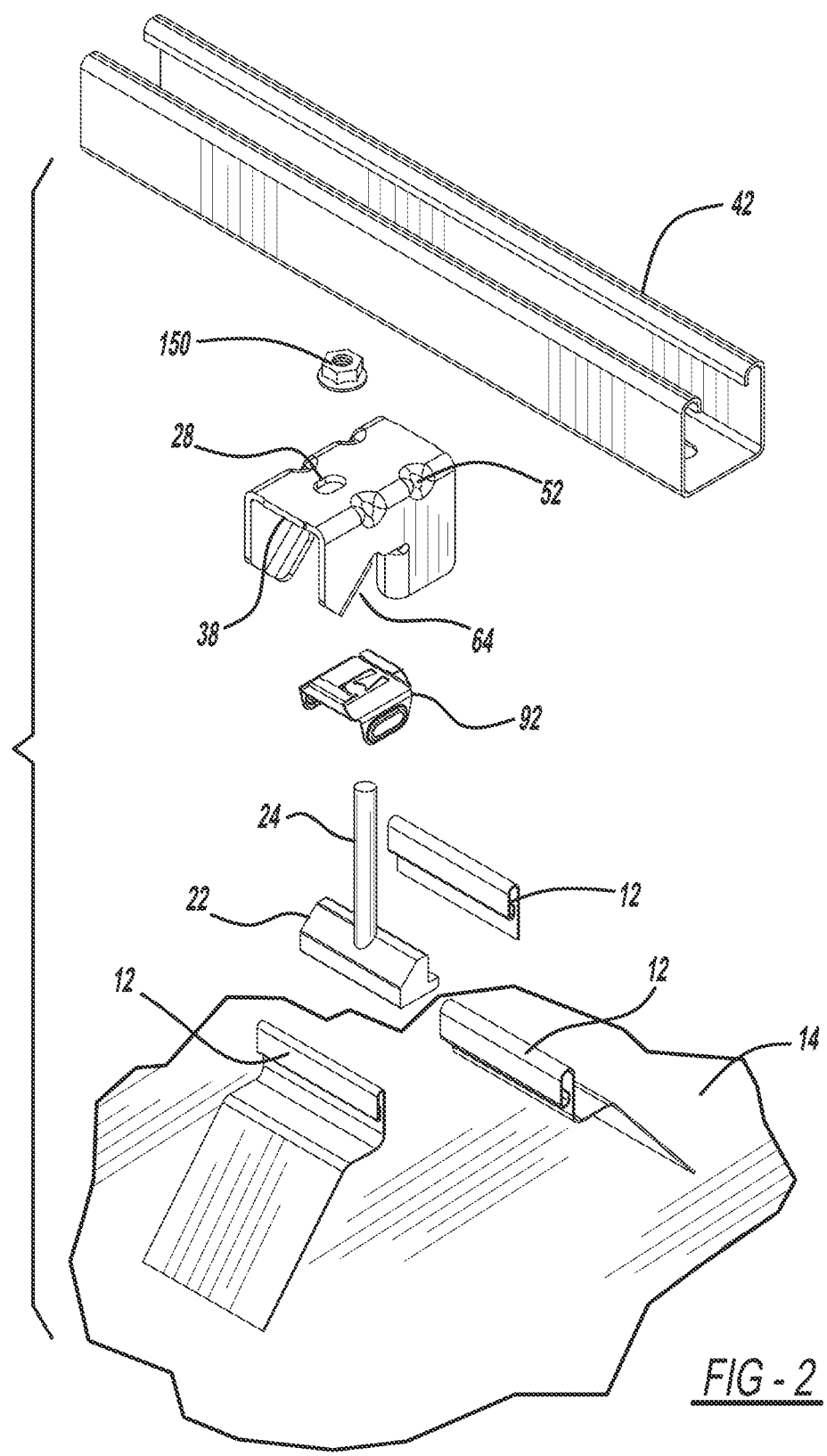
FIG. 2 depicts an exploded perspective view of a roof seam having a first embodiment of a roof clamp attached according to the present teachings.

FIG. 1 depicts a cross-sectional view of a roof clamp 10 attached to a seam 12 of a roof 14. Roof 14 is of any suitable sheet material including metal as a non-limiting example. Seam 12 includes a pair of overlapping edges which are folded over to create an interlocking joint, also known as a standing seam or flange. Roof clamp 10 is made of any suitable material or combination of materials, such as metals or polymers having adequate strength to secure to roof 14 and endure harsh heat, cold, and precipitation of outdoor weather but is preferably aluminum or stainless steel. Generally, roof clamp 10 includes a saddle 20, a roof seam-engaging wedge 22, and a securing member 24. An optional part includes a retaining element, such as clip 92. As will be further detailed below, and as shown in FIG. 2, securing member 24 fits into and aligns saddle 20 with wedge 22 so that upon engaging securing member 24 camming action of roof seam-engaging wedge 22 along saddle 20 secures roof clamp 10 to roof 14. Notably the same securing member 24 that secures roof clamp 10 to roof 14 also secures an auxiliary component 40, such as rail 42, to roof along a top surface 26 of saddle 20.

Turning to FIGS. 3-5, saddle 20 includes top surface 26 including a saddle bore 28, a bottom surface 30, two sidewalls 32 spanning from top surface 26 to the bottom surface 30, and a camming surface 34 located on each sidewall 32. Saddle 20 is an inverted U-shape or a bifurcated yoke body. Saddle 20 includes a saddle exterior 36 and a saddle interior 38. Saddle top surface 26 serves as the interface for attachment of an auxiliary component 40, such as rail 42 (shown in FIG. 2), a solar panel module, a snow guard 54 or snow guard 300 (see FIGS. 16-17 and FIGS. 27-28C, respectively). Further, saddle top surface 26 serves as the region through which securing member 24 is advanced or retracted so that seam 12 is engaged.

Each saddle sidewall 32 includes at least one interior surface feature 44 and/or at least one exterior surface feature 46. As shown in FIG. 4, saddle 20 includes the interior surface features 44 or protrusions 50 to engage the retaining member 90 as detailed later herein. The interior surface features 44 are independently sized or are mated with another part such as the retaining member 90 to provide an interference fit or a snap-in fit.

With respect to exterior surface feature 46, strengthening darts 52 are provided on the exterior of saddle 20 and located at the intersection between top surface 26 and sidewall 32. Darts 52 are depressions in the stamped material that improve the structural integrity of saddle 20. Darts 52 are of any suitable shape such as a crease, a dimple, a square, a circle, an ellipse, or a free-form shape, as non-limiting examples. While four strengthening darts 52 are shown in FIG. 3, it is understood that single dart 52 is suitable to be used for the entire saddle 20 and that the strengthening dart 52 is suitable for placement at another location on saddle 20.

FIG. 5 illustrates a flattened blank 60 used to form saddle 20. The blank 60 is bent by a set of progressive dies to provide the contours of saddle 20. The stamped nature of saddle 20 advantageously saves weight and part cost over traditional cast or extruded clamps, which is important when an installer is carrying multiple clamps on a sloping roof. Even after the bending, saddle 20 includes only a single saddle bore 28 to secure the clamp 10 to roof 14 and also to affix the auxiliary component 40 along top surface 26 of saddle 20. In various aspects, saddle 20 lacks any other bores extending completely through saddle 20 aside from saddle bore 28.

Flattened saddle blank 60 also provides tabbed portions 62 of the sidewall 32. Tabbed portions 62 are optionally folded inwardly to form a portion of camming surfaces 34 as shown by the curved region on FIG. 3. In other aspects, tabbed portions 62 are not folded inwardly but edges of the regions still provide camming surface 34. Camming surface 34 is formed along each of the sidewalls 32 of saddle 20. Camming surface 34 is at any suitable diagonal angle. As shown in FIG. 5, flattened saddle blank 60 shows the tabbed portions 62 that are folded inwardly to provide camming surface 34. Even without the inwardly folded tabbed portions 62, a sidewall angled region 64 would still form camming surface 34.

With further reference to FIG. 3, saddle 20 defines a slot 70 which serves in part to engage roof seam 12 of roof 14 and also to serve as camming surface 34. Slot 70 includes a substantially vertical area and is adjacent camming surface 34 to facilitate trapping or clamping roof seam 12 in roof clamp 10. The vertical area of slot 70 adjacent the angled camming surface 34 allows roof clamp 10 to be angled over roof seam 12 of roof 14 instead of allowing solely a vertical placement.

This accommodates any roof 14 that has irregularities and allows a single size of roof clamp 10 to be used on different sized roof seams 12.

Turning to FIGS. 6 and 7, roof seam-engaging wedge 22 is depicted. Roof seam-engaging wedge 22 includes a wedge top surface 72 and a wedge bore 74 that extend through wedge top surface 72. Wedge bore 74 allows securing member 24 to pass through roof seam-engaging wedge 22 and into saddle 20 to secure roof clamp 10 on roof seam and to also secure auxiliary component 40 using the single securing member 24. Although the present disclosure and examples detail a roof seam-engaging wedge 22 that includes wedge bore 74 to accommodate securing member 24, in other aspects of the present teachings roof seam-engaging wedge 22 is welded to or integrally formed with securing member 24.

Roof seam-engaging wedge 22 includes at least one angled surface 76 that mates with camming surface 34 so that when securing member 24 is actuated, wedge angled surface 76 moves along camming surface 34. As depicted in FIG. 1, the mated and angled surface 76 has the same angle as camming surface 34 defined by saddle 20. In still other aspects of the present teachings, the angle of camming surface 34 is different than the angle of wedge angled surface 76.

Figure 12:
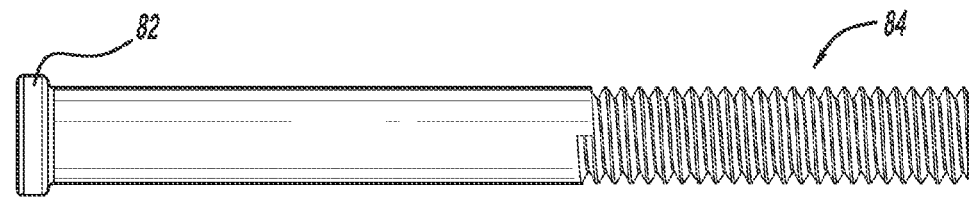
FIG. 12 depicts a side view of a partially-threaded bolt according to the present teachings.
Figure 13:
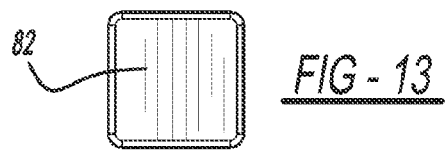
FIG. 13 depicts a top view of a square-head of a fastener according to the present teachings.
Figure 14:
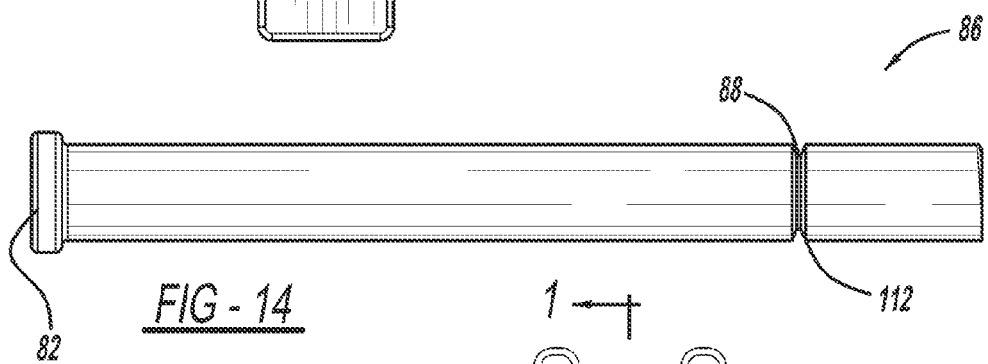
FIG. 14 depicts a side view of an elongated shaft having an annular groove according to the present teachings.
Figure 15:
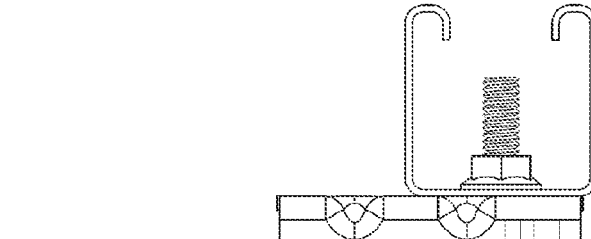
FIG. 15 depicts a side view of an assembled roof clamp attached to a roof seam according to the present teachings.
Figure 16:
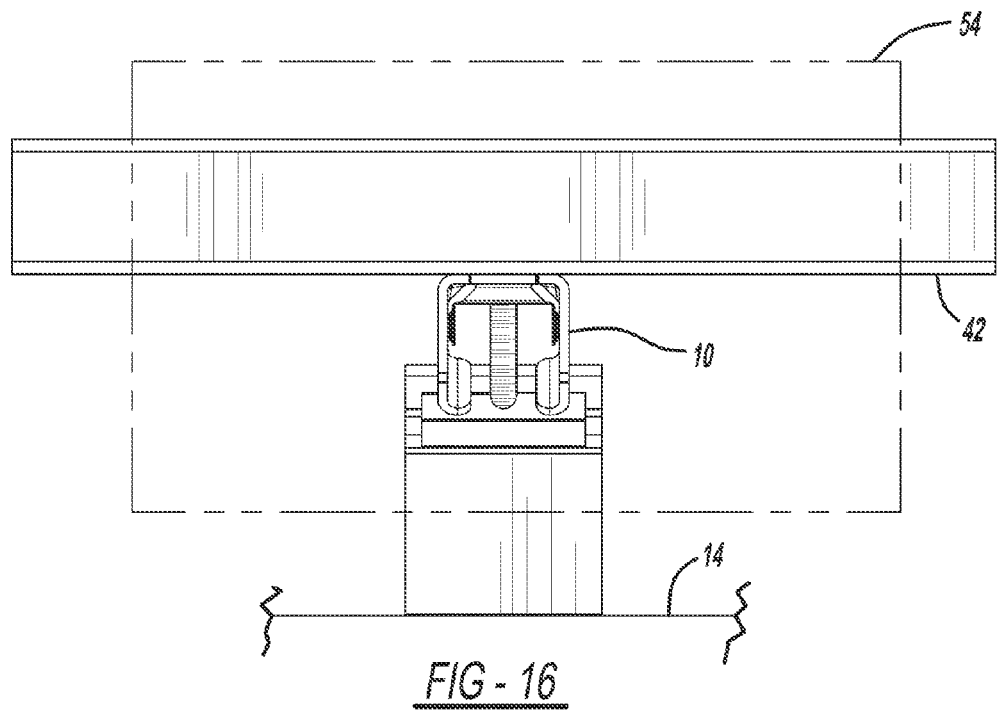
FIG. 16 depicts a perspective view of an assembled roof clamp attached to a roof seam with a rail and auxiliary component attached to the roof clamp according to the present teachings.
Figure 17:
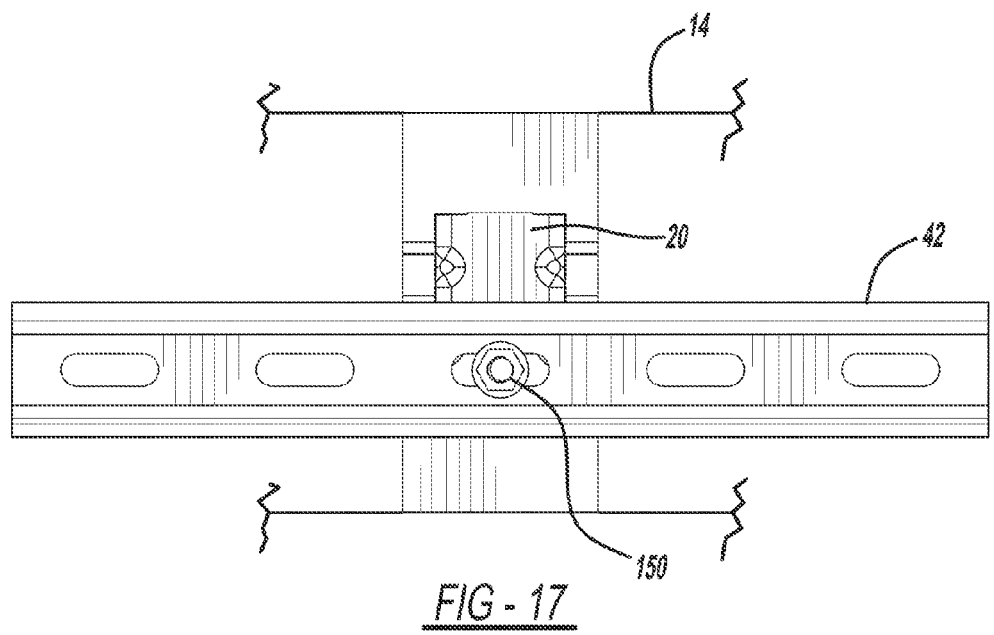
FIG. 17 depicts a top view of an assembled roof clamp and rail attached to a roof seam according to the present teachings.
Figure 18:
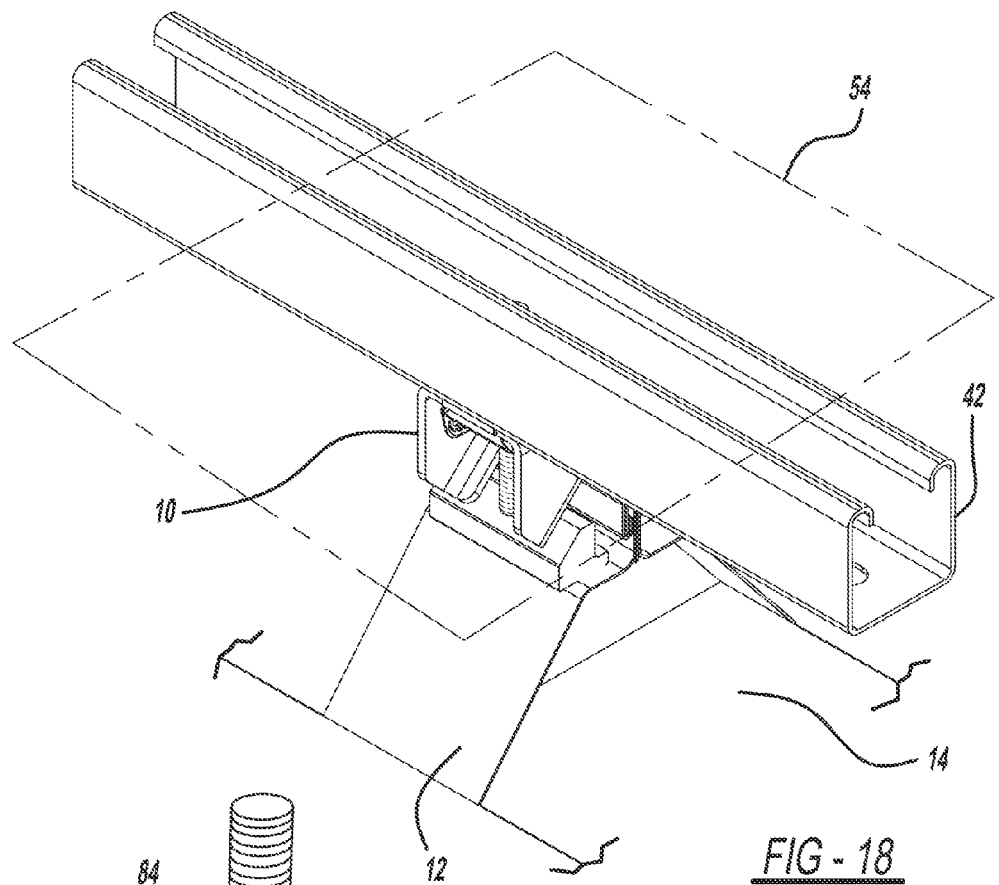
FIG. 18 depicts a perspective view of an assembled roof clamp attached to a roof seam and a rail and auxiliary component attached to the roof clamp according to the present teachings.

In select aspects roof seam-engaging wedge 22 includes a cut out 78 along the bottom surface 80. Cut out 78 provides a region into which a region of securing member 24, such as a head 82 of a bolt 84 as shown in FIGS. 12-14, is recessed. By recessing head 82 of bolt 84 or other fastener into the bottom surface 80 of roof seam-engaging wedge 22, roof clamp 10 is flush and abuts roof seam 12 and/or roof 14 adjacent roof seam as shown in FIG. 1.

With respect to FIGS. 1 and 2, securing member 24 fits into and aligns saddle bore 28 and wedge bore 74. In select aspects, saddle bore 28 and wedge bore 74 are axially aligned. Securing member 24 is selected from bolt 84 or an elongated shaft 86. With respect to bolt 84, bolt 84 is fully-threaded or partially-threaded. Bolt 84 optionally includes a head 82 as depicted in FIGS. 12 and 13. Other bolts 84 that are suitable for use with the present teachings do not include head 82 and only include a fully or partially threaded shaft. Such bolts are free from an intervening nut or other fixation element in various aspects of the present teachings.

Where securing member 24 is an elongated shaft 86, shaft 86 is smooth or it includes at least one surface feature 88. These surface features 88 are generally not angled or pitched with respect to the diameter of shaft 86 like threads. Instead, the surface features 88 include an element such as an annular groove, an annular undercut, or an annular protrusion. This allows for passage of securing member 24 through wedge bore 74 and saddle bore 28. The surface feature 88 engages another region of roof clamp 10 without a threaded engagement. The elongated shaft 86 optionally includes head 82.

Referring to FIGS. 8-11 and 19-21B, various retaining elements 90 are depicted. Generally, retaining element 90 is disposed between a saddle interior 38 and wedge top surface 72 as best shown in the exploded view of FIG. 2. Protrusions 50 on the inside of saddle 20 as shown in FIG. 4 provide an element with which retaining element 90 mates. This is either by a snap fit or interference fit to prevent retaining element 90 from becoming dislodged from saddle 20 prior to roof seam-engaging wedge 22 engaging retaining element 90. Retaining element 90 non-threadedly engages securing member 24 to retain it in retaining element 90.

Figure 9:
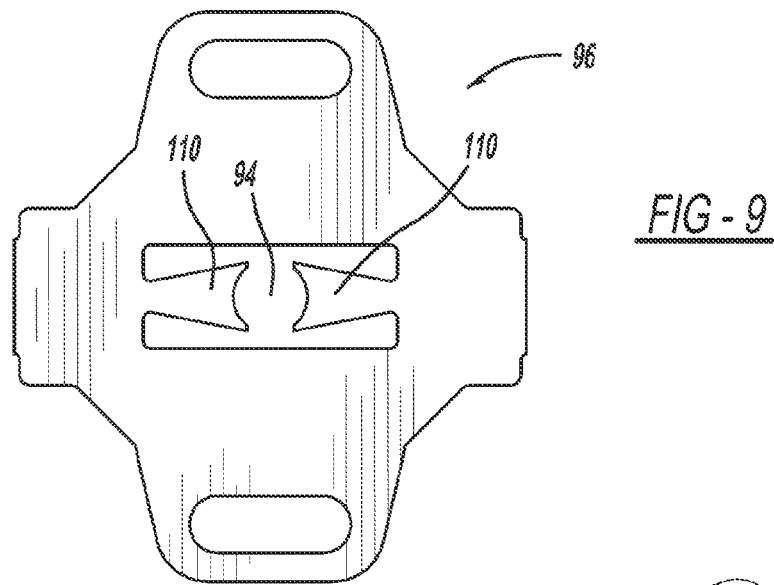
FIG. 9 depicts a flattened blank for a clip of the first embodiment of the roof clamp according to the present teachings.
Figure 10:
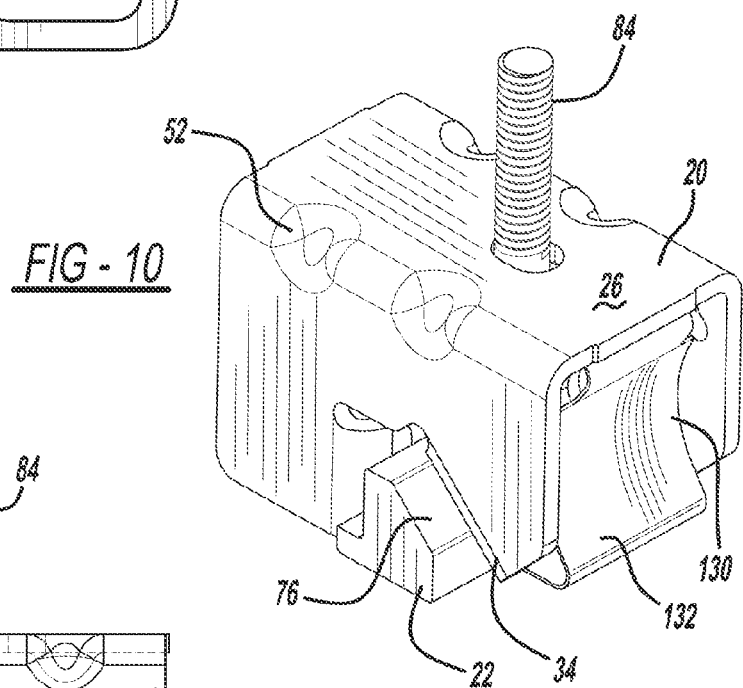
FIG. 10 depicts a perspective view of a second embodiment of an assembled roof clamp with a spring according to the present teachings.
Figure 11:
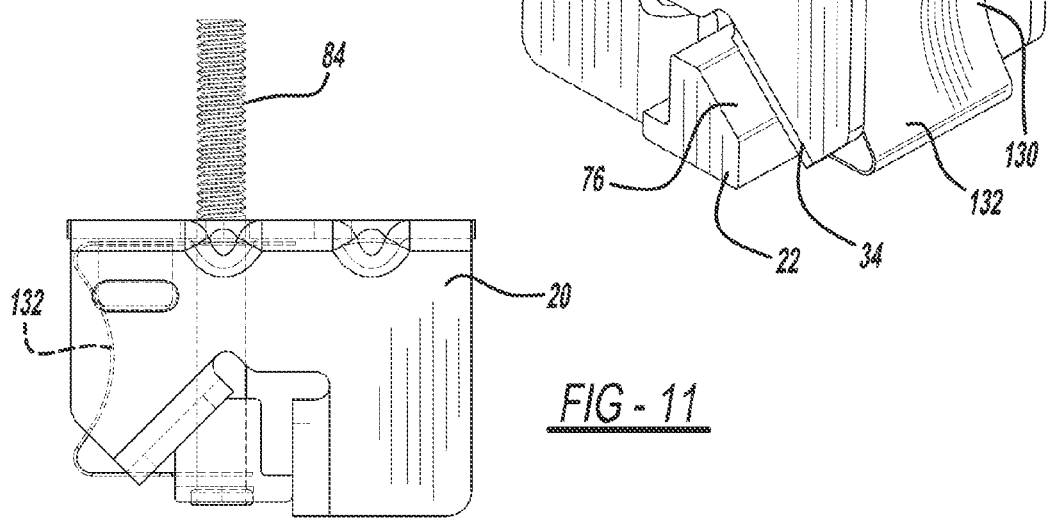
FIG. 11 depicts a side view of an assembled roof clamp of the second embodiment with a spring according to the present teachings.

Referring to FIGS. 1, 8, and 9, retaining element 90 is depicted as a clip 92. Clip 92 includes at least one clip bore 94, a securing member 24 engaging feature, and spacers 120. These features are shown on the clip blank 96 as shown in FIG. 9, which is bent to form retaining element 90. When clip 92 is disposed in saddle 20, clip bore 94 is axially aligned with saddle bore 28. Clip bore 94 is defined by securing member engaging flaps 110.

Securing member engaging flaps 110 are spaced apart to accommodate either the passage of securing member 24 or the retention of securing member 24. Where partially-threaded bolt 84 or elongated shaft 86 is used as securing member 24, flaps 110 engage a smooth portion of bolt 84 or elongated shaft 86 to retain retaining element 90. Where elongated shaft 86 having an undercut or annular groove 112 is used as securing member 24, flaps 110 removably engage undercut or annular groove 112 to thereby selectively and removably stop movement of elongated shaft 86 should securing member 24 not be further advanced or retracted. The engagement is removable by exerting a longitudinal pulling or pushing force on securing member 24 to cause flaps 110 to bend and release undercut or annular groove 112. Similarly, should a threaded region of bolt 84 engage flaps 110, the engagement is a non-threaded engagement such that longitudinal pulling or pushing force on securing member 24 would cause flaps 110 to bend and allow the threaded region to pass.

Spacers 120 on clip 92 keep flaps 110 some distance from interior 38 adjacent saddle top surface 26. As shown in FIG. 1, spacers 120 keep flaps 110 away from interior 38 adjacent saddle top surface 26.

Figure 19:
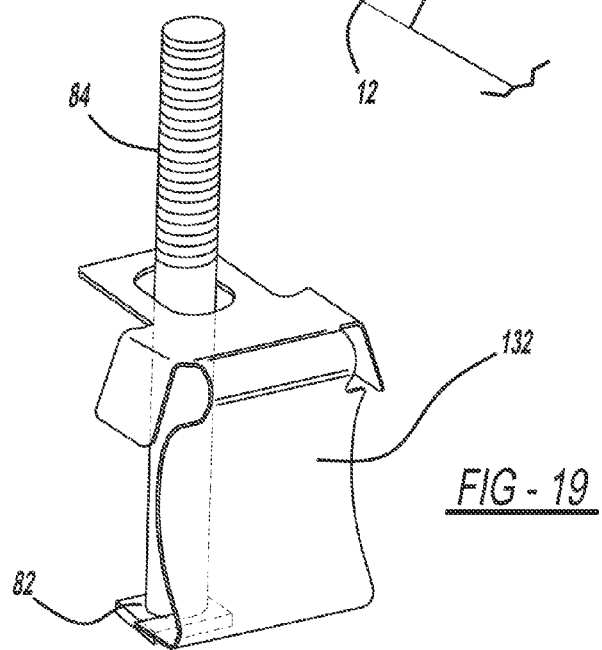
FIG. 19 depicts a leaf spring according to the present teachings.
Figure 20:
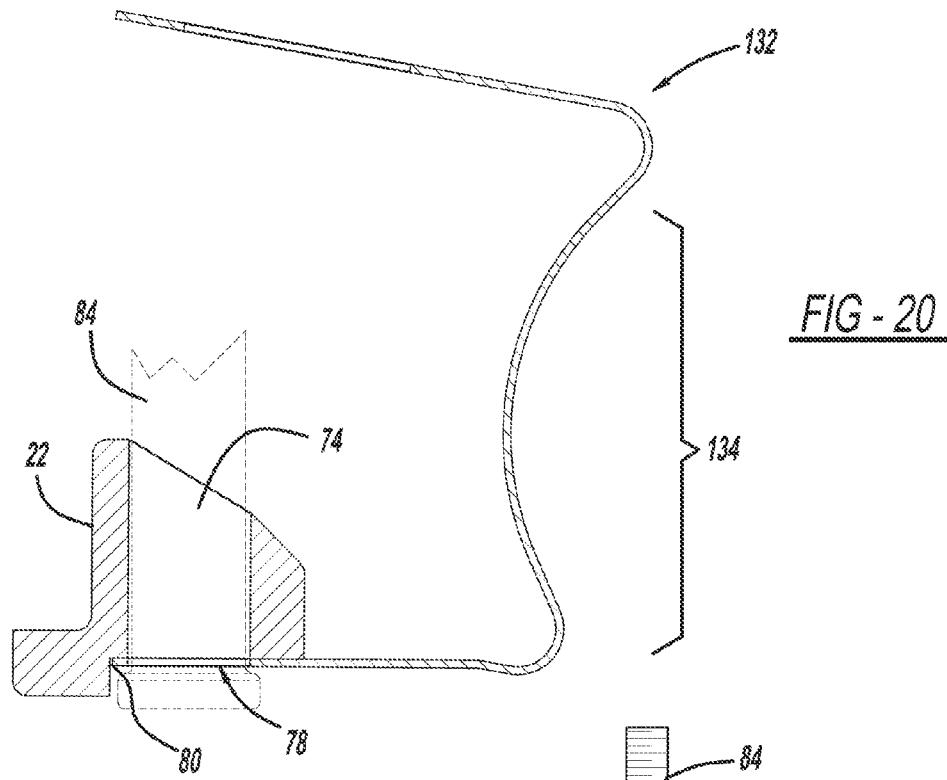
FIG. 20 depicts a side view of a leaf spring connected to a roof seam-engaging wedge according to the present teachings.

In other aspects, retaining element is a spring 130 as shown in FIGS. 10-11 and 19-21(B) Exemplary springs include a leaf spring 132 as shown, a compression spring, or an extension spring (not shown). As best depicted in FIGS. 19-21, leaf spring 132 is attached to a bottom surface 80 of roof seam-engaging wedge 22 and also to interior 38 adjacent saddle top surface 26. As depicted in FIG. 19, leaf spring 132 includes two attachment points that allow a portion of securing member 24 to pass through. Leaf spring 132 includes a resilient central region 134 defining a bend that allows leaf spring 132 to elongate to facilitate the simplified installation of roof clamp 10 by allowing an pre-assembled roof clamp 10 as disclosed later herein.

When assembled, saddle bore 28 and wedge bore 74 are axially aligned when roof seam-engaging wedge 22 is engaged with camming surface 34. When roof clamp 10 is assembled, a distal region of securing member 24 extends beyond top surface 26 of saddle 20. The distal region of securing member 24 that extends beyond top surface 26 of saddle 20 is also used to secure a component to roof clamp 10. An auxiliary component 40, such as a solar panel module or a snow guard, is affixed to saddle 20 along a top surface 26 of saddle 20. Securing member 24 is multi-purpose in that it secures roof seam-engaging wedge 22 and saddle 20 to clamp roof seam 12 and also provides the region by which the auxiliary component 40 is attached.

In use, the various roof clamps 10 of the present teachings attach a component to seam 12 of a building. A roof clamp 10 is mounted onto roof seam 12 such that roof seam 12 protrudes into a substantially vertically accessible slot of roof clamp 10. Single securing member 24, such as the shaft or bolt, is used to move roof seam-engaging wedge 22 of roof clamp 10 into engagement with roof seam 12. A component is then mounted to the single securing member 24. Notably, this uses a single element to both secure roof clamp 10 to the roof and also to secure auxiliary component 40 to the roof seam. This facilitates ease of installation, reduces the need to unnaturally contort hands when installing roof clamp 10, and allows auxiliary component 40 to be attached along top surface 26 of roof clamp 10. Further, moving the shaft to cause roof seam-engaging wedge 22 to engage and trap seam 12 and fastening the component to the shaft all occurs on top of roof clamp 10.

Figure 21A:
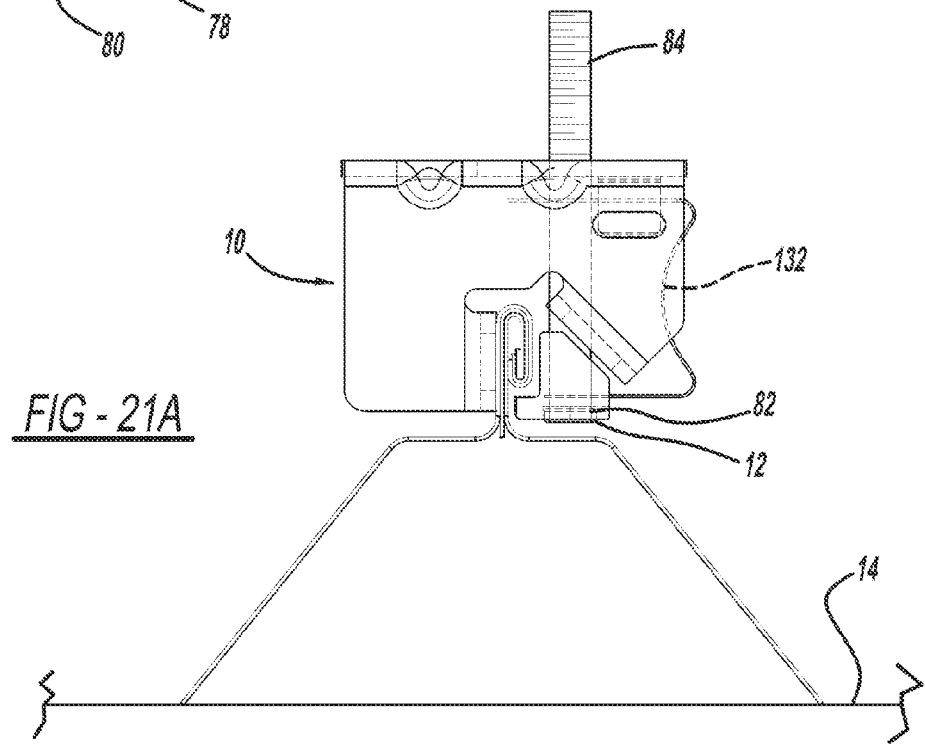
Figure 24:
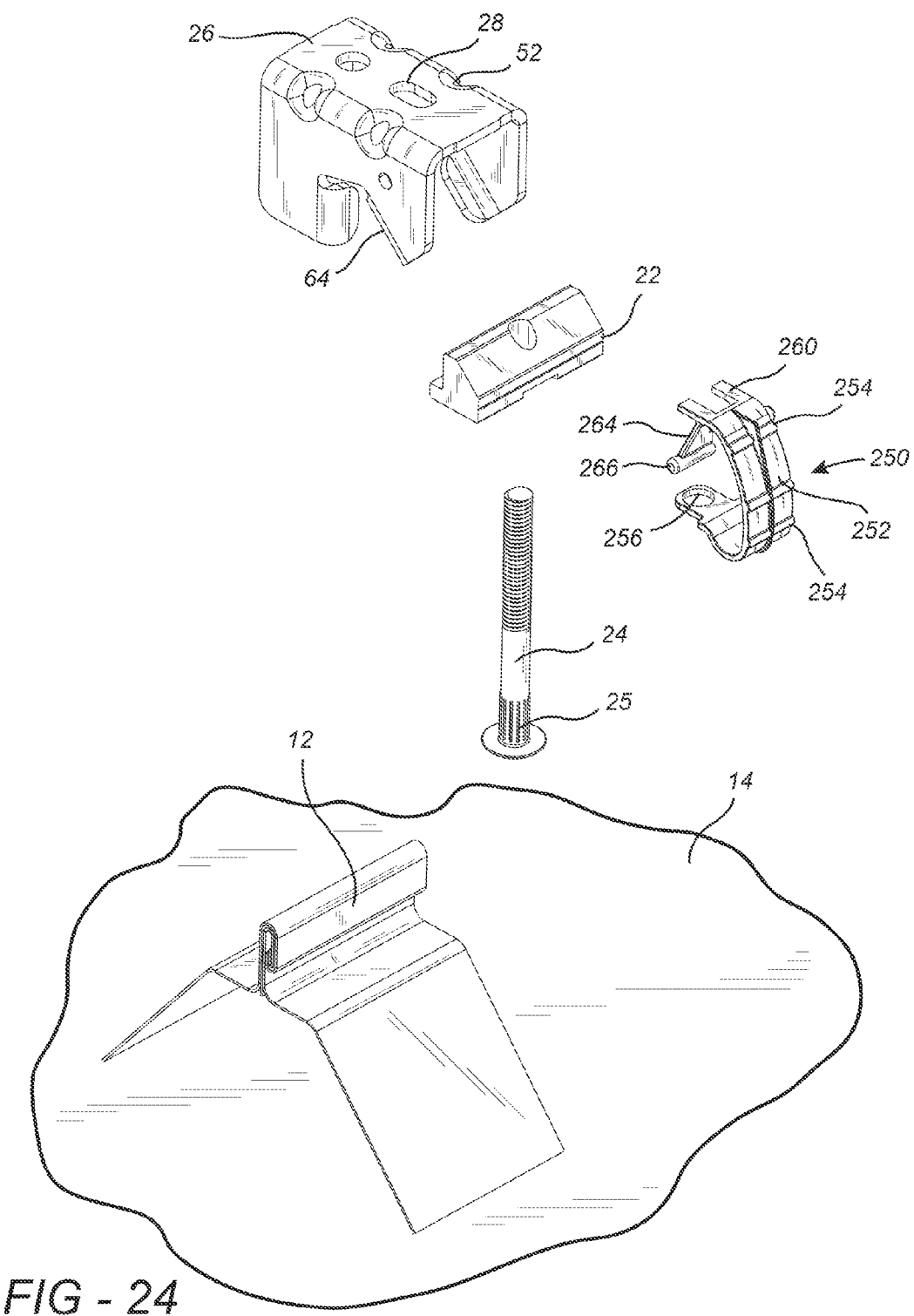
FIG. 24 depicts an exploded perspective view of a roof seam having a preferred and fourth embodiment of a roof clamp attached according to the present teachings.

Roof clamp 10 is removably fixed to seam 12. By linearly and axially moving securing member 24, roof clamp 10 is fixed to or removed from seam 12. To retract roof seam-engaging wedge 22 along camming surface 34 of saddle 20 such that roof seam-engaging wedge 22 is in further proximity from saddle 20, securing member 24 is axially moved in a second direction. In other aspects, this provides an open position in which roof clamp 10 is manipulated to place it around seam 12 as shown in FIG. 21A. To move roof seam-engaging wedge 22 along camming surface 34 of saddle 20 such that roof seam-engaging wedge 22 is in closer proximity to saddle 20, securing member 24 is rotated or axially moved in a first direction. In various aspects, this provides a closed position in which roof clamp 10 is in immediate and compressive engagement with seam 12 to fix roof clamp 10 to seam 12 as shown in FIG. 21B.

To retain roof clamp 10 in either the open or the closed position, a single top surface fastener 150, such as an internally threaded nut, is used. For example, to keep roof clamp 10 in the closed position, top surface fastener 150 is secured to a portion of securing member 24 extending beyond top surface 26 of saddle 20 as shown in FIG. 21B. The auxiliary component 40 is attached using the top surface fastener 150 or a different fastener (not shown). Where a shaft 86 is used, securing member 24 places roof seam-engaging wedge 22 and saddle 20 in a non-threaded engagement. In such aspects, a non-threaded securing member 24 is used to secure roof clamp 10 in the closed position.

Saddle 20, roof seam-engaging wedge 22, securing member 24, and optional retaining element 90 are pre-assembled prior to placing roof clamp 10 in the proximity of roof seam 12. Pre-assembled refers to some or all of the components being aligned such that securing member 24 keeps them together. This can be achieved either at the work site or, more preferably, at a remote site such as the factory at which roof clamp 10 is manufactured, as non-limiting examples.

In aspects where a leaf spring 132 or other resilient member is used as the retention member instead of element 90, an additional method of securing roof clamp 10 to roof 14 is as follows. Leaf spring 132 depicted in FIGS. 19-21B is actuated to place roof clamp 10 components of roof seam-engaging wedge 22 and saddle 20 into a first position. As a non-limiting illustration, as shown in FIG. 21A, the first position is an open or unclamped position where roof seam-engaging wedge 22 is biased away from saddle 20. The actuating is achieved by depressing, lifting, or rotating securing member 24. Roof clamp 10 in the first position is then placed over seam 12 of roof 14 to place seam 12 between roof seam-engaging wedge 22 and a portion of saddle 20. Seam 12 is trapped between roof seam-engaging wedge 22 and saddle 20 by placing the resilient member or spring 132 in a second position to retract roof seam-engaging wedge 22 along a camming surface 34 defined by saddle 20. As a non-limiting illustration, shown in FIG. 21B, the second position is a closed or clamped position where roof seam-engaging wedge 22 is biased towards saddle 20. This closed or clamped position is removably maintained by attaching a fastener to securing member 24. As stated above, the clamped position is also reversible.

When roof seam-engaging wedge 22 is retracted to trap seam 12 between roof seam-engaging wedge 22 and saddle 20 (or when roof clamp 10 is in the closed position), a portion of securing member 24 extends beyond a top surface 26 of saddle 20. Where securing member 24 is a bolt, head 82 of bolt 84 is secured to roof seam-engaging wedge 22 such that when roof seam-engaging wedge 22 is retracted to trap seam 12, the distal end of bolt 84 extends beyond a top surface 26 of saddle 20 to provide an attachment point for the auxiliary component 40.

In various aspects, roof clamp 10 is transported or shipped in the closed position. Optionally, roof clamp 10 includes a top surface fastener 150 to keep roof clamp 10 in the closed position. In use, the installer or other user removes the fastener, places roof clamp 10 in the open position over roof seam 12, engages roof seam 12 with roof clamp 10, and then moves securing member 24 to return roof clamp 10 to the closed position. Shipping or otherwise transporting or storing roof clamp 10 in the closed position expedites installation.

Turning to FIGS. 24-26D, a preferred embodiment of roof clamp 10 is provided. Similar to the embodiment of FIGS. 21A and B as detailed above, roof clamp 10 is placed over seam 12 of roof 14 to trap and secure seam 12 using a resilient member that is a spring clip 250.

Figure 25:
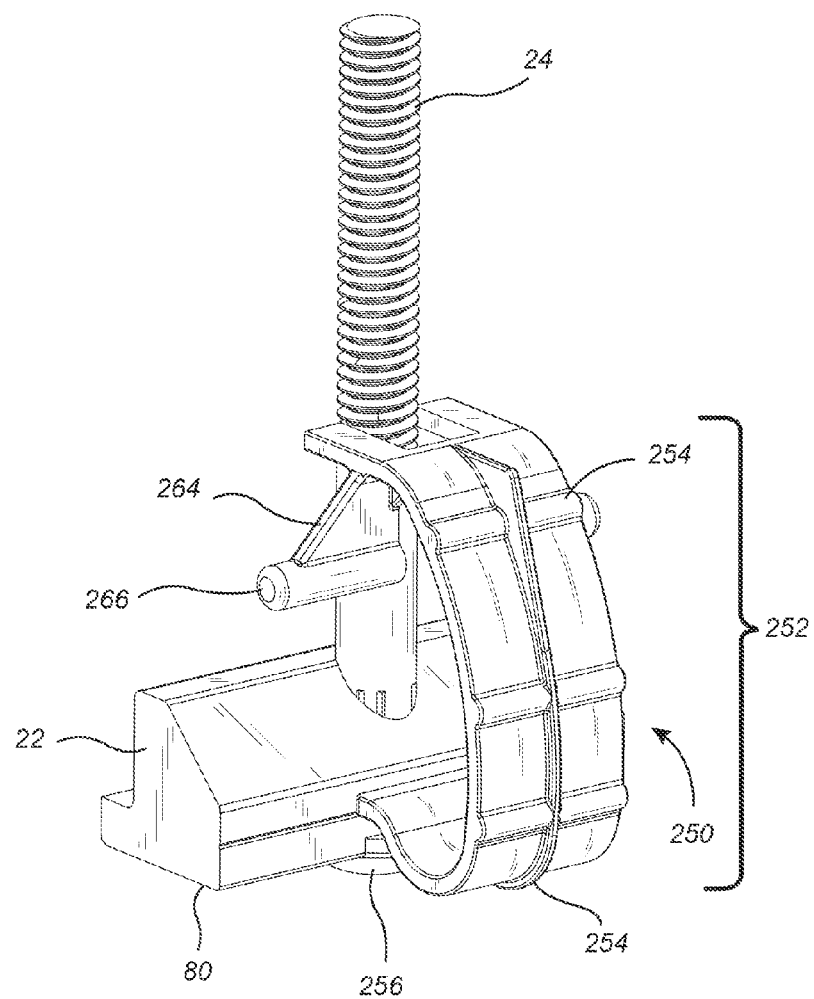
FIG. 25 depicts a perspective view of an assembled roof seam-engaging wedge and a spring clip according to the fourth embodiment of the present teachings.

Spring clip 250 is adjacent cutout 78 on bottom surface 80 of roof seam-engaging wedge 22 at one end and adjacent interior 38 adjacent saddle top surface 26 at the other end. As best depicted in FIGS. 25-26C, spring clip 250 allows a portion of securing member 24 to pass therethrough. Securing member 24 as depicted includes ribs 25 which extend along a lower portion and may prevent or limit rotation of securing member 24 with respect to roof seam-engaging wedge 22. Turning to FIGS. 26A-26C, spring clip 250 includes a resilient central region 252 defining a bend that allows spring clip 250 to elongate to facilitate the simplified installation of roof clamp 10, particularly a pre-assembled roof clamp 10 as detailed above. Central region 252 optionally includes ribs 254 along central region 252. Ribs 254 help strengthen the spring clip 250 and make it easier to remove from an injection molding die. Ribs 254 are suitably placed either vertically, longitudinally, and/or in any other angular arrangement with respect to central region 252. Spring clip 250 is preferably injection molded from an acetal copolymer.

To facilitate passage of securing member 24, spring clip 250 further includes an opening 256 at a first end and a pair of arms 260 that define a yoke-like passage 262 at a second end through which securing member 24 passes. As depicted, arms 260 extend in a direction generally parallel to interior 38 that is adjacent saddle top surface 26. While arms 260 are depicted as being generally parallel to interior 38, it is understood that the arms may be otherwise angled with respect to the interior 38. Extending downwardly from arms 260 are panels 264 terminating in pins 266 to allow spring clip 250 to be held in saddle 20. While pins 266 are depicted as generally cylindrical and being spaced apart by a gap, it is understood that other shapes, with our without gaps, are also suitable for the present teachings.

Arms 260 brace against interior 38 that is adjacent saddle top surface 26. In various aspects, the placement and bracing of arms 260 is in lieu of retaining clip 90 as used in the first and second embodiments. The combination of the flexibility of spring clip 250, securing spring clip 250 to bottom 80 of seam-engaging wedge 22, and arms 260 facilitating the bracing align and retain securing member 24 with respect to seam-engaging wedge 22 and saddle 20.

In this embodiment, neither arms 260 nor opening 256 lockingly engage securing member 24. For example, the threads on securing member 24 adjacent arms 260 are not threadedly engaged with securing member 24 such that axial movement of securing member 24 with respect to arms 260 is restricted. Further, opening 256 is of sufficient dimensions to advance securing member 24.

When this embodiment of the roof clamp 10 is assembled, saddle bore 28 and wedge bore 74 are axially aligned when roof seam-engaging wedge 22 is engaged with camming surface 34. Similar to the preceding configuration, when roof clamp 10 is assembled a distal region of securing member 24 extends beyond top surface 26 of saddle 20. The distal region of securing member 24 that extends beyond top surface 26 of saddle 20 is also used to secure a component to roof clamp 10. As detailed above, auxiliary component 40, such as a solar panel or a snow guard, is affixed to saddle 20 along a top surface 26 of saddle 20. Securing member 24 is multi-purpose in that it secures roof seam-engaging wedge 22 and saddle 20 to clamp roof seam 12 and also provides the region by which auxiliary component 40 is attached.

As shown in FIG. 29, an alternate clip 290 is depicted as part of a fifth embodiment. Clip 290 includes a resilient central region 292 that allows clip 290 to elongate for installation. Tabs 294 secure spring clip 290 to saddle 20. A channel 296 extends along central region 292 to accommodate securing member 24. Further, an opening 298 receives securing member 24 along wedge bottom 80.

Figure 27:
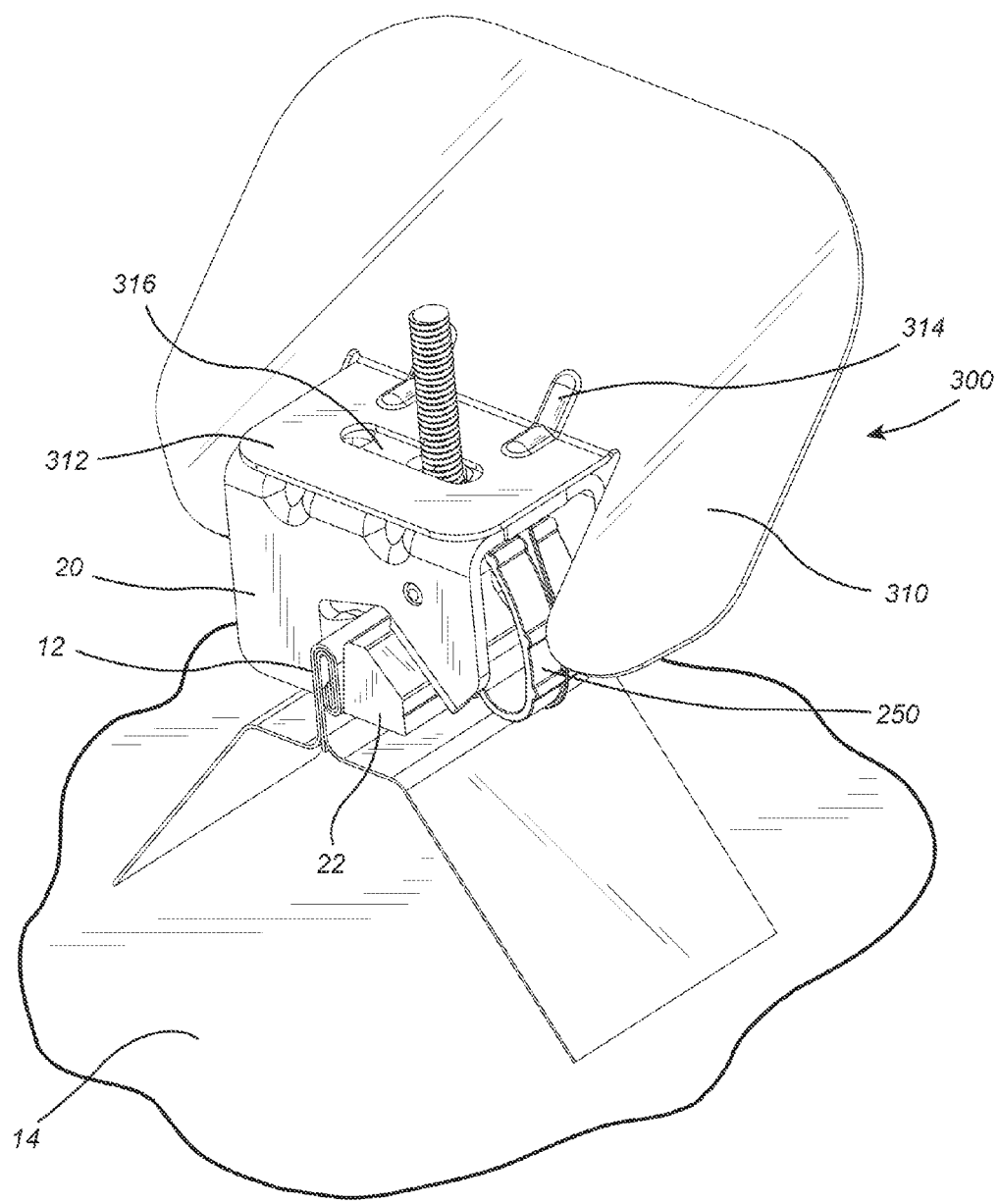
FIG. 27 depicts an assembled roof clamp of the fourth preferred embodiment in connection with a snow guard.
Figure 28A:
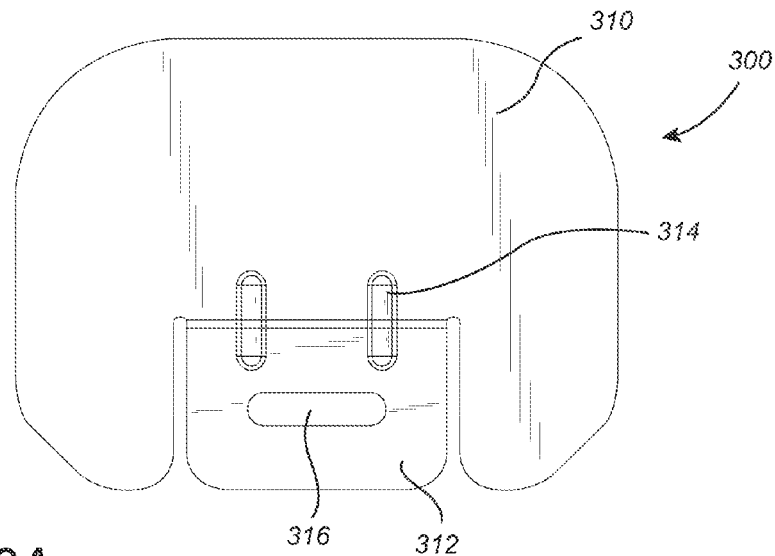
FIG. 28A depicts the snow guard according to the fourth embodiment of the present teachings.
Figure 28B:
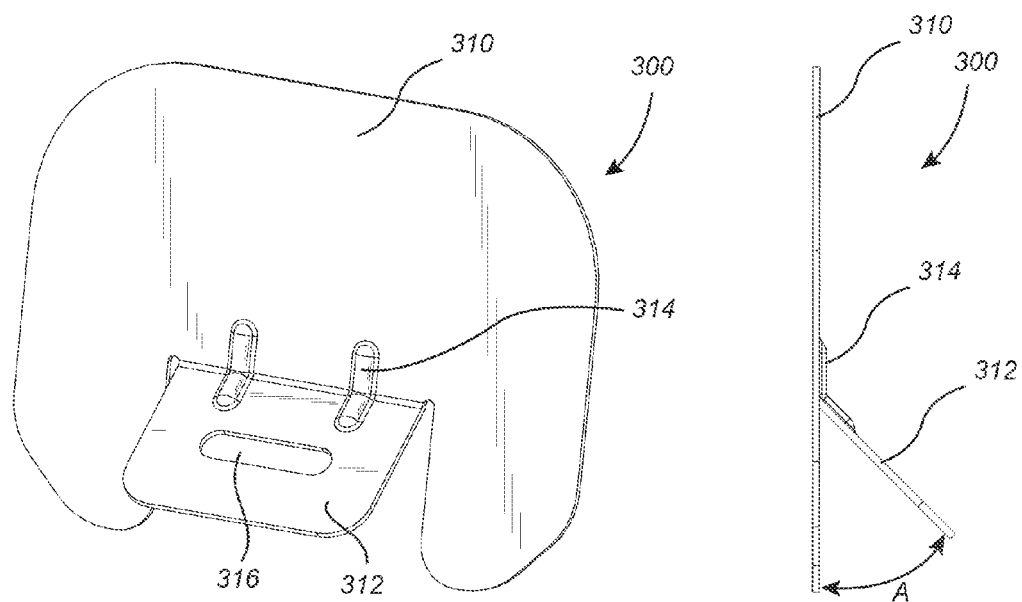
FIG. 28B depicts the snow guard when the tab is angled away from the pad according to the fourth embodiment of the present teachings.
Figure 28C:
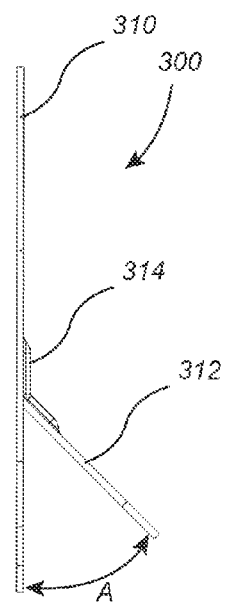
FIG. 28C depicts a side view of the snow guard when the tab is angled away from the pad according to the fourth embodiment of the present teachings.

Turning to FIGS. 27-28C, a snow guard 300 is depicted as auxiliary component 40, which is attached to roof clamp 10 of the preferred embodiment. Snow guard 300 is preferably stamped from 301 or 304 stainless steel. While depicted with the preferred embodiment, snow guard 300 is suitable for use with any of the disclosed roof clamps of the present teachings.

Snow guard 300 includes a pad 310 and a connected tab 312. A stiffening dart or bend 314 is also included at the interface of pad 310 and connected tab 312. As shown in FIG. 27, pad 310 stands diagonally proud with respect to upper surface 26 of the saddle 20. Pad 310 is shown as a solid, generic squared shape having rounded edges, but it is understood that pad 310 is of other suitable shapes for decorative or snow-retention purposes. In various aspects, pad 310 optionally includes surface indicia such as alphanumeric values or an image. The surface indicia is stamped, printed, or otherwise applied to the substrate of the pad 310.

Tab 312 is secured to top surface 26 of saddle 20 using a bore 316 defined by an internal slotted edge of tab 312. Bore 316 is sized to allow securing member 24 to pass therethrough as best shown in FIG. 27. Notably, bore 316 does not threadedly engage securing member 24 and does not prevent axial movement of securing member 24 with respect thereto. A single nut, such as fastener 150 shown in FIG. 1, is used to simultaneously secure roof clamp 10 and snow guard 300 to roof 14 solely from the top surface which is most accessible to the installer.

The dart or bend 314 allows snow guard 300 to be angled, if necessary, with respect to tab 312 which is fixed to top surface 26 of saddle 20. As shown in FIG. 28C, as indicated by arrow A, the angle of tab 312 with respect to pad 310 may be varied in response to the weight of the snow or based on the desired angle of installation.

FIGS. 22-23 show an alternate embodiment of a polymeric roof clamp 200 according to aspects of the present teachings. Roof clamp 200 includes a polymeric base 202, a polymeric central component 204, a polymeric upper component 206, a securing member 208, a rail 210, and a metal roof seam-engaging wedge 212. As best shown in FIG. 23, the securing member 208 is in the form of a shaft that is used to axially align the other components in respective bores of the other components. Base 202 defines a substantially vertical slot to receive roof seam 12. Similar to the previous description, actuation of securing member 208 advances a roof seam-engaging wedge 212 to trap seam 12 between seam-engaging wedge 212 and base 202. An auxiliary component such as a snow guard or a solar panel as detailed above is attached to polymeric roof clamp 200 using securing member 208 and the rail 210. Notably, polymeric roof clamp 200 allows an auxiliary component to be attached to polymeric roof clamp 200 using the same securing member 208 used to facilitate the securing of the polymeric roof clamp 200.

The foregoing description has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A roof clamp for attaching a component to a roof seam of a building, the roof clamp comprising:
  (a) a saddle;
  (b) a roof seam-engaging wedge;
  (c) a substantially vertically accessible slot adapted to engage a roof seam, the slot being at least partially defined between a surface of the saddle and the wedge;
  (d) a single shaft operable to move the wedge into a roof seam-engaging position and being adapted to allow securement of the component to the roof seam, the single shaft being elongated in a direction substantially parallel to the substantially vertically accessible slot and the single shaft also being adapted to secure the component to the saddle; and
  (e) a retainer disposed between an interior surface of the saddle and the wedge to hold the wedge to the saddle at least prior to roof seam engagement.

2. The roof clamp of claim 1, wherein the retainer is a spring.

3. The roof clamp of claim 1, further comprising sidewalls each including the roof seam-access slot with a roof seam-abutment surface on an opposite side of the access slot from a camming surface formed on the sidewalls.

4. The roof clamp of claim 1, wherein the saddle defines a saddle bore and the wedge includes a wedge bore, the wedge is engaged with at least one camming surface on the saddle, and a spring pushes the saddle away from a top wall of the saddle.

5. The roof clamp of claim 1, wherein the single shaft is a bolt that is at least partially-threaded.

6. The roof clamp of claim 1, wherein the single shaft is a longitudinally elongated shaft with a laterally enlarged head contacting the wedge which is prevented from rotation by the wedge.

7. The roof clamp of claim 1, wherein the single shaft is a non-threaded shaft that includes a peripheral groove between a head and a distal end, the head being adjacent the wedge.

8. The roof clamp of claim 1, wherein the component includes an elongated rail affixed to the saddle via the single shaft.

9. The roof clamp of claim 1, wherein the component comprises a snow guard affixed to the saddle via the single shaft.

10. The roof clamp of claim 1, wherein when the roof clamp is assembled, a threaded region of the single shaft extends beyond a top wall of the saddle to secure the roof clamp to the seam and to also secure the component to the roof clamp, and the component is further attached to at least a second roof clamp.

11. A roof clamp comprising:
(a) a saddle comprising a top wall including a saddle bore, spaced apart sidewalls projecting from the top wall, and camming surfaces located at the sidewalls, the sidewalls being made from a sheet of material, the saddle including roof seam-access slots aligned through the sidewalls and a substantially inverted U-shape end view substantially perpendicular to a plane through the slots;
(b) a roof seam-engaging wedge riding along the camming surfaces in at least one operating condition;
(c) a securing member located through the saddle bore and moving the wedge between a roof seam-engaging position and an open position; and
(d) a retainer disposed between an interior surface of the saddle and the wedge to hold the wedge to the saddle at least prior to roof seam engagement.

12. The roof clamp of claim 11, wherein the retainer is a spring.

13. The roof clamp of claim 11, wherein the sidewalls each include the roof seam-access slot with a roof seam-abutment surface on an opposite side of the access slot from the camming surfaces, the sidewalls and the top wall of the saddle defining the substantially inverted U-shape end view.

14. The roof clamp of claim 11, wherein the securing member is an elongated shaft which is prevented from rotation relative to the wedge.

15. The roof clamp of claim 11, wherein the wedge includes at least one surface that mates with the camming surfaces and the wedge laterally extends outboard past the sidewalls, further comprising a spring contacting against the wedge and the saddle.

16. The roof clamp of claim 11, wherein the securing member is a bolt that is at least partially-threaded at a distal end extending above the top wall of the saddle and the bolt also has a laterally enlarged section adjacent a proximal end which contacts the wedge, further comprising a nut pulling the proximal end of the bolt and the wedge toward the top wall of the saddle.

17. The roof clamp of claim 11, further comprising an elongated rail affixed to the saddle via the securing member.

18. The roof clamp of claim 11, further comprising a snow guard affixed to the saddle via the securing member.

19. A roof clamp comprising:
(a) a bifurcated clamp body comprising:
  (i) a surface having a bifurcated clamp body bore;
  (ii) a surface defining a vertical slot;
  (iii) two sidewalls spanning from an upper surface to a lower surface in a spaced-apart manner; and
  (iv) a camming surface connected to each of the sidewalls;
(b) a spring within the bifurcated clamp body, the spring defining a spring bore;
(c) a roof seam-engaging wedge; and
(d) a bolt to align the bifurcated clamp body bore, the spring bore, and the roof seam-engaging wedge,
the bolt being adapted to both secure at least one of a rail or snow guard to the saddle, and cause the wedge to be secured to a roof seam.

20. The roof clamp of claim 19, wherein the two sidewalls are free from any bores, and a enlarged head of the bolt contacts the wedge.

21. The roof clamp of claim 19, further comprising a clip located between an interior of the upper surface of the bifurcated clamp body and a top surface of the wedge.

22. The roof clamp of claim 21, wherein the clip non-threadedly engages the bolt and retains the wedge to the clamp body at least prior to full installation.

23. The roof clamp of claim 19, wherein the bifurcated clamp body bore and the wedge are axially aligned when the wedge is engaged with the camming surface, and an elongated axis of the bolt is substantially perpendicular to a plane defined by the upper surface of the clamp body.

24. The roof clamp of claim 19, wherein the bolt includes a non-threaded shaft that defines at least one of an annular groove or a non-annular groove.

25. The roof clamp of claim 19, wherein the rail, which is elongated substantially parallel to the roof seam, is affixed to the bifurcated clamp body by only the bolt.

26. The roof clamp of claim 19, further comprising the snow guard affixed to the bifurcated clamp body.

27. The roof clamp of claim 19, wherein when the roof clamp is assembled, a region of the bolt extends through the bifurcated clamp body bore and beyond the bifurcated clamp body upper surface to thereby secure the roof clamp to the seam and to thereby secure a component to the roof clamp.

28. The roof clamp of claim 19, wherein the spring is a leaf spring with one portion contacting the wedge and another portion contacting the clamp body.

29. A roof clamp comprising:
(a) a sheet metal clamp body comprising a camming surface, a side wall having a slot, an upper wall having a bore, and a clamping surface;
(b) a wedge comprising a camming surface, a bore and a clamping surface, the camming surface of the wedge riding along the camming surface of the clamp body in at least one operating condition;
(c) an elongated member extending through the bore of the body upper wall and through the bore of the wedge;
(d) a resilient member attached to at least two of: the clamp body, the wedge and the elongated member; and
(e) a standing roof seam located in the slot of the clamp body and being clamped between the clamping surfaces of the wedge and the clamp body by the installer pushing the elongated member relative to the clamp body to allow access of the standing roof seam into the slot and then the installer releasing the elongated member to allow the resilient member to move the wedge into a clamping position.

30. The roof clamp of claim 29, wherein the elongated member is a bolt having a head abutting the wedge and having an opposite threaded end protruding above the upper wall of the clamp body.

31. The roof clamp of claim 30, further comprising a nut and an auxiliary component having a hole through which the bolt extends, the nut removeably securing the auxiliary component to the clamp body and also removeably securing the wedge against the standing roof seam.

32. The roof clamp of claim 29, wherein the resilient member is a metallic leaf spring.

33. The roof clamp of claim 29, wherein the resilient member retains the elongated member and the wedge to the clamp body at least prior to installation on the standing roof seam.

34. The roof clamp of claim 29, further comprising an elongated rail attached to the clamp body.

35. A roof clamp comprising:
(a) a saddle comprising a camming surface, a wall including an opening therein, and a clamping surface;
(b) a wedge comprising a camming surface contacting against the camming surface of the saddle, the wedge being spaced apart from the clamping surface of the saddle;
(c) a resilient member biasing the wedge relative to the saddle; and (d) an elongated member extending through the wall opening and including an externally accessible end;

the wedge, resilient member and elongated member all being preassembled to the saddle prior to roof-installation; and pushing of the externally accessible end of the elongated member toward the wall of the saddle overcoming the biasing of the resilient member to open the wedge away from the clamping surface of the saddle.

36. The roof clamp of claim 35, wherein the elongated member is a bolt having an enlarged head contacting the wedge, and the resilient member is a spring.

37. The roof clamp of claim 35, wherein the resilient member connects the wedge to the saddle in the preassembled condition.

38. The roof clamp of claim 35, further comprising an auxiliary component coupled to the saddle via the elongated member and a fastener removeably attached to the elongated member external to the saddle, and the saddle being sheet metal of substantially uniform thickness which includes spaced apart side walls with an access slot disposed in each side wall adjacent the clamping surface of the saddle and an opposed surface of the wedge.

\* \* \* \* \*